US011832332B2

(12) United States Patent
Mildh et al.

(10) Patent No.: US 11,832,332 B2
(45) Date of Patent: *Nov. 28, 2023

(54) RESUMING A CONNECTION IN A WIRELESS COMMUNICATION SYSTEM

(71) Applicant: TELEFONAKTIEBOLAGET LM ERICSSON (PUBL), Stockholm (SE)

(72) Inventors: Gunnar Mildh, Sollentuna (SE); Paul Schliwa-Bertling, Ljungsbro (SE); Magnus Stattin, Upplands Väsby (SE); Christofer Lindheimer, Vadstena (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

This patent is subject to a terminal disclaimer.

(21) Appl. No.: 17/380,882

(22) Filed: Jul. 20, 2021

(65) Prior Publication Data
US 2021/0352755 A1 Nov. 11, 2021

Related U.S. Application Data

(63) Continuation of application No. 16/614,779, filed as application No. PCT/IB2018/054318 on Jun. 13, 2018, now Pat. No. 11,083,040.
(Continued)

(51) Int. Cl.
*H04W 76/27* (2018.01)
*H04W 36/00* (2009.01)
(Continued)

(52) U.S. Cl.
CPC ....... *H04W 76/27* (2018.02); *H04W 36/0033* (2013.01); *H04W 36/36* (2013.01); *H04W 68/005* (2013.01); *H04W 84/042* (2013.01)

(58) Field of Classification Search
CPC .......... H04W 84/042; H04W 36/0033; H04W 68/005; H04W 76/27; H04W 76/11; H04W 36/36; H04W 36/00; H04W 68/00
(Continued)

(56) References Cited

U.S. PATENT DOCUMENTS 9,155,121 B2 * 10/2015 Rayavarapu .......... H04W 76/19
9,247,575 B2 * 1/2016 Rayavarapu .......... H04W 76/19
(Continued)

FOREIGN PATENT DOCUMENTS

CN 103858512 A 6/2014
CN 105635983 A 6/2016
(Continued)

OTHER PUBLICATIONS

3GPP, "3rd Generation Partnership Project; Technical Specification Group Radio Access Network; NR; Radio Resource Control (RRC) protocol specification (Release 15)", Technical Specification, 3GPP TS 38.331 V15.6.0, pp. 1-519, Jun. 2019, 3GPP, France.
(Continued)

*Primary Examiner* — Man U Phan
(74) *Attorney, Agent, or Firm* — Murphy, Bilak & Homiller, PLLC

(57) ABSTRACT

A method performed by a user equipment includes receiving, via a radio access network (RAN), a radio resource control (RRC) message indicating to transition from RRC_CONNECTED to RRC_INACTIVE. The RRC message includes a resume identifier. The user equipment performs a connection resume procedure that includes transmitting, to the RAN, an RRC connection resume request that includes the resume identifier and transmitting, to the RAN, an RRC resume complete message that includes an index of a selected public land mobile network (PLMN) identity.

20 Claims, 23 Drawing Sheets

Related U.S. Application Data

(60) Provisional application No. 62/521,004, filed on Jun. 16, 2017.

(51) Int. Cl.
*H04W 36/36* (2009.01)
*H04W 68/00* (2009.01)
*H04W 84/04* (2009.01)

(58) Field of Classification Search
USPC .......................................................... 370/328
See application file for complete search history.

(56) References Cited

U.S. PATENT DOCUMENTS

| | | | |
|---|---|---|---|
| 9,258,839 B2* | 2/2016 | Rayavarapu | H04W 76/19 |
| 10,009,942 B2* | 6/2018 | Hu | H04W 76/27 |
| 10,264,611 B2* | 4/2019 | Chen | H04W 76/10 |
| 10,485,051 B2* | 11/2019 | Mildh | H04W 68/005 |
| 10,609,608 B2 | 3/2020 | Park et al. | |
| 10,764,815 B2* | 9/2020 | Park | H04W 72/29 |
| 10,785,821 B2 | 9/2020 | Wu | |
| 10,863,394 B2* | 12/2020 | Kim | H04W 76/27 |
| 10,893,568 B2* | 1/2021 | Gage | H04W 12/043 |
| 10,945,303 B2 | 3/2021 | Ohlsson et al. | |
| 11,083,040 B2* | 8/2021 | Mildh | H04W 36/36 |
| 11,206,529 B2* | 12/2021 | Takahashi | H04W 76/30 |
| 11,388,560 B2* | 7/2022 | Futaki | H04W 76/20 |
| 11,388,651 B2* | 7/2022 | Park | H04W 48/20 |
| 11,399,322 B2* | 7/2022 | Ohlsson | H04W 84/042 |
| 2017/0353902 A1* | 12/2017 | Chen | H04W 36/08 |
| 2019/0200410 A1* | 6/2019 | Höglund | H04W 76/27 |
| 2019/0261447 A1* | 8/2019 | Fujishiro | H04W 76/27 |
| 2019/0297661 A1* | 9/2019 | Lee | H04W 76/20 |
| 2020/0053823 A1 | 2/2020 | Mildh et al. | |
| 2020/0092771 A1* | 3/2020 | Ohlsson | H04W 76/27 |
| 2020/0120741 A1 | 4/2020 | Lindheimer et al. | |
| 2020/0214070 A1* | 7/2020 | Ingale | H04W 74/0833 |
| 2020/0252840 A1* | 8/2020 | Liu | H04W 36/00835 |
| 2020/0288423 A1 | 9/2020 | Lindheimer et al. | |
| 2020/0314798 A1* | 10/2020 | Fujishiro | H04W 48/18 |
| 2020/0337107 A1 | 10/2020 | Mildh et al. | |
| 2021/0044964 A1 | 2/2021 | Lindheimer et al. | |
| 2021/0307100 A1* | 9/2021 | Talebi Fard | H04W 76/18 |
| 2022/0174762 A1* | 6/2022 | Pan | H04W 76/27 |

FOREIGN PATENT DOCUMENTS

| | | |
|---|---|---|
| EP | 2645806 A1 | 10/2013 |
| WO | 2017082682 A1 | 5/2017 |
| WO | 20170856211 | 5/2017 |

OTHER PUBLICATIONS

Ericsson, "Draft CR for RRC Connection Suspend and Resume", 3GPP TSG-RAN WG2 Meeting #93, St. Julian's, Malta, Feb. 15-19, 2016, 21 pages, Change Request R2-161744, 3GPP.

Ericsson, "RAN Sharing and identifier aspects in NR", 3GPP TSG-RAN WG2 AH2, Qingdao, P.R. of China, Jun. 27-29, 2017, pp. 1-3, Tdoc R2-176504, 3GPP.

Ericsson, "RRC Connection Suspend and Resume", 3GPP TSG-RAN WG2 NB-IOT Ad-hoc Meeting, Budapest, Hungary, Jan. 19-21, 2016, 14 pages, R2-160475, 3GPP.

Huawei, "NG context fetch for inactive mode UE", 3GPP TSG-RAN3 Meeting #96, Hangzhou, China, May 15-19, 2017, 2 pages, R3-171550, 3GPP.

Huawei, "S1 Context fetch for Light Connection", 3GPP TSG-RAN3 Meeting #94, Reno, Nevada, Nov. 14-18, 2016, 2 pages, R3-162759, 3GPP.

* cited by examiner

RESUMING A CONNECTION IN A WIRELESS COMMUNICATION SYSTEM

This application is continuation of U.S. application Ser. No. 16/614,779, filed Nov. 18, 2019, now U.S. Pat. No. 11,083,040, which is a 371 of International Application No. PCT/IB2018/054318, filed Jun. 13, 2018, which claims priority to U.S. Provisional Application No. 62/521,004, filed Jun. 16, 2017, the disclosures of which are fully incorporated herein by reference.

TECHNICAL FIELD

The present application relates generally to a wireless communication system and relates more specifically to resuming a connection in such a wireless communication system.

BACKGROUND

In order for a radio access network (RAN) to allocate radio resources to a user equipment (UE), a radio resource control (RRC) connection is established between a RAN node and the UE. Establishment of the RRC connection may involve configuring radio bearers between the RAN node and the UE, configuring a security context for the UE, etc. The RAN node stores this and other information associated with the UE's RRC connection as a so-called context for the UE (also referred to as UE context). The context may therefore contain information needed to establish and/or maintain the RRC connection, including for instance information about the UE's security context, data radio bearers, connected slices, UE capabilities, etc.

Release of the RRC connection (e.g., after completion of data transfer) correspondingly releases the UE's context at the RAN node, e.g., such that the RAN node no longer stores that context. Then, if and when the UE needs another RRC connection (e.g., for transfer of newly arrived data), the UE must request establishment of a new RRC connection.

Some systems however support suspension of the RRC connection as an alternative to complete release of the RRC connection. When the RRC connection is suspended, the RAN node preserves the context for the UE rather than releasing it. This way, the UE can request resumption of the RRC connection by providing the RAN node with a so-called resume identifier that the RAN node can use to locate and access the stored context for the UE. With access to the stored UE context, the RAN node need not establish an RRC connection from scratch. This in turn reduces UE latency and UE signalling, which further leads to reduced UE energy consumption.

Some scenarios complicate UE context retrieval. If the UE requests resumption of its RRC connection at a target RAN node that is different than the source RAN node at which the RRC connection was suspended, the target RAN node must be able to locate the source RAN node in order to retrieve the UE's context. In a RAN sharing scenario where RAN nodes are shared among different network operators, though, determining which RAN node stores the UE's context proves particularly challenging, especially in a way that avoids inefficient coordination between the network operators.

SUMMARY

According to some embodiments herein, a resume identifier usable by a user equipment to resume a suspended connection is associated with a public land mobile network (PLMN). The user equipment thereby indicates not only the resume identifier to a target RAN node at which the user equipment requests resumption of the connection, but also indicates the PLMN with which the resume identifier is associated. The target RAN node correspondingly retrieves a context for the connection based on the resume identifier and the indication of the associated PLMN. In some embodiments, associating a PLMN with the resume identifier in this way resolves any ambiguity that might exist regarding which RAN node stores the context for the connection, without coordination between RAN sharing operators and/or without negative impact on user equipment performance (e.g., in terms of battery consumption, delays due to unnecessary signaling, etc.).

More particularly, embodiments herein include a method performed by a user equipment. The method comprises receiving at the user equipment, from a source radio access network, RAN, node with which the user equipment has a connection, a message indicating that the connection is to be suspended and indicating a resume identifier usable by the user equipment to resume the connection after the connection is suspended. The method also comprises, while the connection is suspended, transmitting from the user equipment to a target RAN node a request to resume the connection, wherein the request includes the resume identifier. The method further comprises transmitting from the user equipment to the target RAN node an indication of a public land mobile network, PLMN, with which the resume identifier is associated.

In some embodiments, the method further comprises receiving a paging message that includes the resume identifier and the indication of the PLMN associated with the resume identifier. In this case, transmitting the request to resume the connection is performed responsive to receiving the paging message.

Embodiments herein also include a method performed by a target radio access network, RAN, node. The method comprises receiving at the target RAN node a request from a user equipment to resume a connection that was suspended between the user equipment and a source RAN node. The request includes a resume identifier. The method further comprises receiving at the target RAN node, from the user equipment, an indication of a public land mobile network, PLMN, with which the resume identifier is associated. The method also comprises retrieving by the target RAN node a context for the connection, based on the resume identifier and the indication of the PLMN with which the resume identifier is associated.

In some embodiments, retrieving the context based on the resume identifier and the indication comprises identifying, based on the resume identifier and the indication of the PLMN with which the resume identifier is associated, an interface to a RAN node which maintains the context for the connection. In this case, the method further comprises retrieving, over the identified interface, the context for the connection.

In other embodiments, retrieving the context based on the resume identifier and the indication comprises determining, based on the resume identifier and the indication of the PLMN with which the resume identifier is associated, that an interface to a RAN node which maintains the context for the connection is not available at the target RAN node. In this case, the method may further comprise selecting, based on the indication of the PLMN with which the resume identifier is associated, a core network node that supports the PLMN with which the resume identifier is associated; and transmitting a request for the context to the selected core network node, wherein the request includes the resume identifier.

Embodiments further include a method performed by a source radio access network, RAN, node. The method comprises establishing a connection between the source RAN node and a user equipment. The method also comprises transmitting from the source RAN node a message to the user equipment indicating that the connection is to be suspended and indicating a resume identifier usable by the user equipment to resume the connection after the connection is suspended. The method further comprises transmitting from the source RAN node to the user equipment an indication of a public land mobile network, PLMN, with which the resume identifier is associated.

In some embodiments, the method further comprises storing a context for the connection and storing in the context, or in association with the context, the indication of the PLMN with which the resume identifier is associated.

In the method performed by the target RAN node or the source RAN node, the method may further comprises transmitting a paging message that includes the resume identifier and the indication of the PLMN with which the resume identifier is associated.

In any of the above methods, the resume identifier in some embodiments is associated with a RAN node identity that identifies, using a RAN node addressing space shared by different PLMNs, a RAN node which maintains a context for the connection while the connection is suspended.

In any of the above methods, different PLMNs in some embodiments have the same set of resume identifiers usable by user equipments to resume suspended connections.

In any of the above methods, the indication of a PLMN with which the resume identifier is associated in some embodiments is an indication of a PLMN with which the user equipment is registered or an indication of a PLMN selected by the user equipment.

In any of the above methods, the indication of the PLMN with which the resume identifier is associated in some embodiments comprises an index of a specific PLMN identity in a list of PLMN identities, wherein each PLMN identity in the list has an associated index.

Embodiments herein also include corresponding apparatus, computer programs, and carriers of such computer programs. For example, embodiments herein include a user equipment configured to receive, from a source radio access network, RAN, node with which the user equipment has a connection, a message indicating that the connection is to be suspended and indicating a resume identifier usable by the user equipment to resume the connection after the connection is suspended. The user equipment may also be configured to, while the connection is suspended, transmit to a target RAN node a request to resume the connection, wherein the request includes the resume identifier. The user equipment may be further configured to transmit to the target RAN node an indication of a public land mobile network, PLMN, with which the resume identifier is associated.

Embodiments also include a radio access network, RAN, node configured to operate as a target RAN node. The RAN node is configured to receive a request from a user equipment to resume a connection that was suspended between the user equipment and a source RAN node. The request includes a resume identifier. The RAN node is also configured to receive, from the user equipment, an indication of a public land mobile network, PLMN, with which the resume identifier is associated. The RAN node is further configured to retrieve a context for the connection, based on the resume identifier and the indication of the PLMN with which the resume identifier is associated.

Embodiments further include a radio access network, RAN, node configured to operate as a source RAN node. The RAN node is configured to establish a connection with a user equipment. The RAN node is also configured to transmit a message to the user equipment indicating that the connection is to be suspended and indicating a resume identifier usable by the user equipment to resume the connection after the connection is suspended. The RAN node is further configured to transmit to the user equipment an indication of a public land mobile network, PLMN, with which the resume identifier is associated.

DETAILED DESCRIPTION

Figure 1:
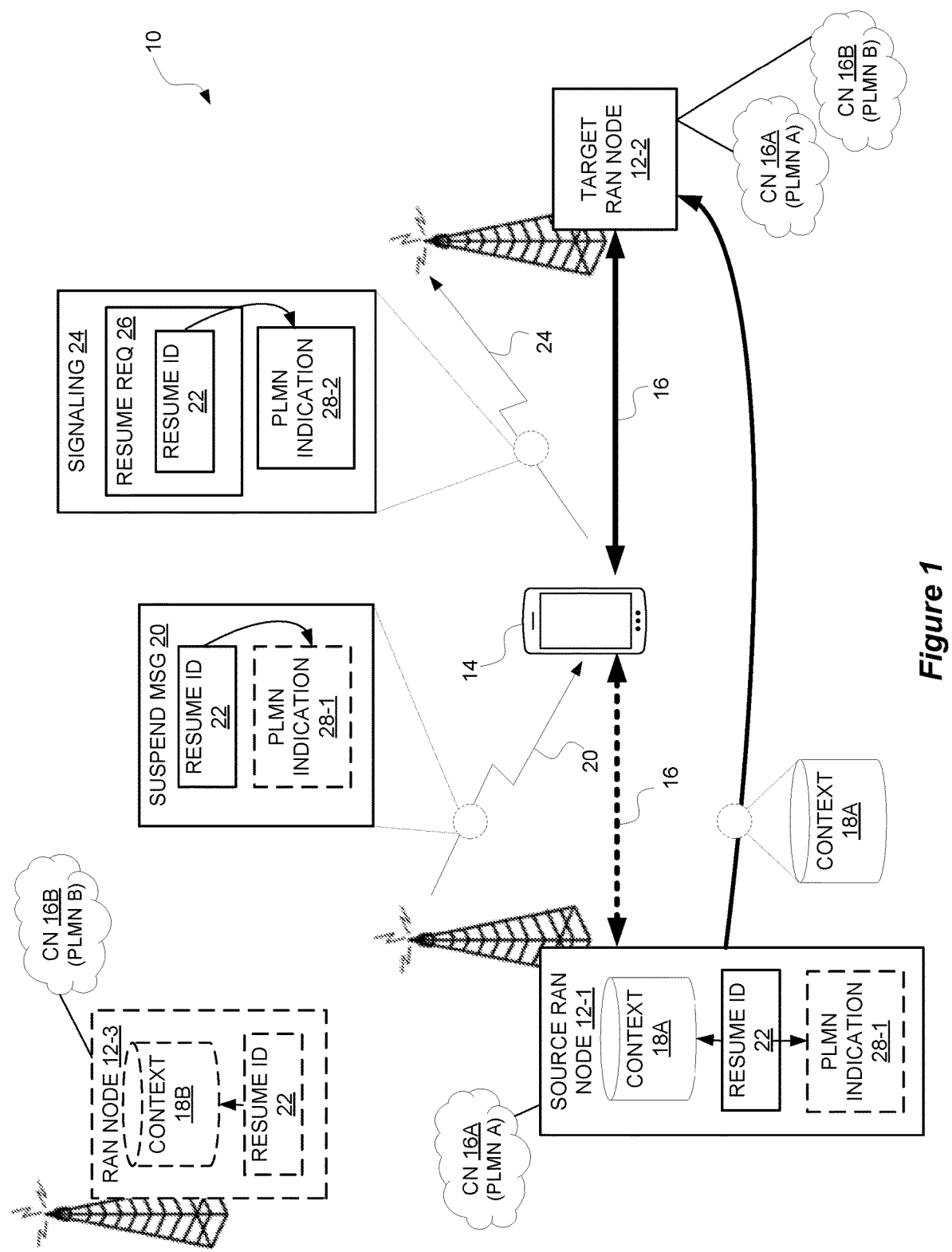
FIG. 1 is a block diagram of a wireless communication system that includes a user equipment and RAN nodes according to some embodiments.

FIG. 1 shows a wireless communication system 10 according to some embodiments. The system 10 includes a radio access network (RAN) node 12-1 (e.g., a base station) and a user equipment (UE) 14. The RAN node 12-1 establishes a connection 16 with the UE 14 over a radio interface in order to connect the UE 14 with a core network (CN) 16A of public land mobile network (PLMN) A. The CN 16A may in turn connect the UE 14 to one or more data networks such as the Internet.

The connection 16 may be a control plane connection such as a radio resource control (RRC) connection. In some embodiments, for instance, the connection 16 is the highest layer in the control plane of an access stratum (AS) and transfers messages of a non-access stratum (NAS). In these and other embodiments, then, the connection 16 may be used for broadcast of system information, paging, transfer of non-access stratum (NAS) information, access stratum (AS) security configuration, transfer of UE radio access capability, measurement configuration and reporting, and/or mobility control. Regardless, with the connection 16 established, the RAN node 12-1 is able to allocate radio resources to the UE 14 and the UE 14 can correspondingly send or receive user data.

Establishment of the connection 16 may involve configuring radio bearers between the RAN node 12-1 and the UE 14, configuring a security context for the UE 14, etc. The RAN node 12-1 stores this and other information associated with the UE's connection 16 as a so-called context 18A (also referred to as UE context). The context 18A for the connection 16 may therefore contain information needed to establish and/or maintain the connection 16, including for instance information about the UE's security context, data radio bearers, connected slices, UE capabilities, etc.

Release of the connection 16 (e.g., after completion of user data transfer) releases the context 18A for the connection 16 at the RAN node 12-1, e.g., such that the RAN node 12-1 no longer stores that context 18A. Where the connection 16 is an RRC connection, for instance, the connection 16 may be released as part of transitioning the UE 14 from RRC_CONNECTED state to RRC_IDLE state. Regardless, if and when the UE 14 needs another connection (e.g., for transfer of newly arrived user data), the UE 14 must request establishment of a new connection from scratch.

In some embodiments, though, the RAN node 12-1 and UE 14 support suspension of the connection 16 as an alternative to complete release of the connection 16. As shown in this regard, the RAN node 12-1 transmits to the UE 14 (e.g., after a certain period of UE inactivity) a message 20 indicating (e.g., commanding) that the connection 16 is to be suspended. Where the connection 16 is an RRC connection, the UE 14 may enter an RRC-INACTIVE state after suspending the connection 16. Regardless, the suspend message 20 also includes a resume identifier (ID) 22 that is usable by the UE 14 to resume the connection 16 after the connection 16 is suspended. Indeed, rather than releasing the context 18A for the connection 16 as done when releasing the connection 16, the RAN 12-1 preserves the context 18A for the UE's connection 16; that is, the RAN 12-1 continues to store the context 18A even while the connection 16 is suspended. Moreover, the RAN node 12-1 maps or otherwise associates the stored context 18A for the connection 16 with the resume identifier 22. This way, the UE 14 can provide the RAN node 12-1 with the resume identifier 22 and the RAN node 12-1 can resume the connection 16 using the associated context 18A, rather than having to establish a new connection from scratch. Where the connection 16 is an RRC connection, for instance, the UE 14 may request resumption of the connection 16 as part of transmitting from RRC_INACTIVE to RRC_CONNECTED state.

The UE 14 can however request that the connection 16 be resumed at a target RAN node 12-2 (also referred to as a new serving RAN node) that is the same or different than the source RAN node 12-1 (also referred to as an old serving RAN node) at which the connection 16 was suspended. The UE 14 may do so for instance after the UE moves from one place to another during suspension of the connection 16. As shown in FIG. 1 in this regard the UE 14 requests that the connection 16 be resumed at a target RAN node 12-2 that also connects to the CN 16A of PLMN A. To do so, the UE 14 transmits to the target RAN node 12-2 signalling 24 that includes a request 26 to resume the connection 16 (at the target RAN node 12-2). In some embodiments, the request 26 may be referred to as message 3 (MSG3) in a random access procedure.

Regardless, in order to resume the connection 16, the target RAN node 12-2 needs to be able to locate where the context 18A for the connection 16 is stored, either at the target RAN node 12-2 itself or at another RAN node. In some embodiments, then, the source RAN node 12-1 forms the resume identifier 22 from an identity of the RAN node storing the context 18A for the connection 16. The resume identifier 22 may also be formed from an identity of the UE 14 for which the context 18A is stored, e.g., such that the resume identifier 22 is the concatenation of the RAN node identity and the UE identity. The UE 14 correspondingly includes the resume identifier 22 in the request 26 to resume the connection 16, so that the target RAN node 12-2 can use that resume identifier 22 to identify and retrieve the context 18A from the source RAN node 12-1.

In some embodiments, though, the resume identifier 22 is specific to a certain public land mobile network (PLMN), meaning that the resume identifier 22 is unique only within a certain PLMN. It is not globally unique across multiple PLMNs. This may be for instance due to the RAN node identity (from which the resume identify is formed) being PLMN-specific. In fact, in some embodiments, the resume identifier 22 is associated with a RAN node identity that identifies, using a RAN node addressing space shared by different PLMNs, a RAN node which maintains the context 18A for the connection 16 while the connection 16 is suspended. That is, different PLMNs re-use the same RAN node identity addressing space. Effectively, then, different PLMNs have the same set of resume identifiers usable by UEs to resume suspended connections.

This proves particularly meaningful in a scenario where RAN nodes are shared among operators of different PLMNs. Unless the PLMN operators divide or coordinate their usage of resume identifiers, different RAN nodes may associate the same resume identifier with different contexts and thereby create ambiguity regarding which context is to be used for resuming a connection.

Consider for instance the scenario shown in FIG. 1 where the target RAN node 12-2 is shared among an operator of PLMN A and an operator of PLMN B. In this case, the target RAN node 12-2 may be connected to not only the CN 16A of PLMN A but also to a CN 16B of PLMN B. The target RAN node 12-2 may correspondingly have interfaces (e.g., Xn interfaces) to both RAN nodes used by PLMN A (such as source RAN node 12-1) and RAN nodes used by PLMN B (such as RAN node 12-3). Because the operators of PLMNs A and B do not divide or coordinate their usage of resume identifiers, the source RAN node 12-1 for PLMN A and the RAN node 12-3 for PLMN B may associate the same resume identifier 22 with the different contexts 18A and 18B. This may be for instance because the source RAN node 12-1 and the other RAN node 12-3 are identified using the same RAN node identity. Regardless, this means that the resume identifier 22 itself may not unambiguously indicate to the target RAN node 12-2 from which of the RAN nodes 12-1 or 12-3 to retrieve the context 18A for the connection 16 that UE 14 requests resumption of.

Some embodiments herein facilitate context retrieval in these and other scenarios by associating the resume identifier 22 with a PLMN. As shown in FIG. 1, for instance, the UE 14 transmits to the target RAN node 12-2 an indication 28-2 of the PLMN with which the resume identifier 22 is associated, e.g., the PLMN to which the UE 14 connected using the connection 16, namely PLMN A. The PLMN associated with the resume identifier 22 (e.g., as defined according to one or more rules) may be for instance the PLMN with which the UE 14 is registered, the PLMN selected by the UE 14, or the primary PLMN of the cell or primary synchronization signal (PSS)/secondary synchronization signal (SSS) where the resume identifier 22 was assigned. Regardless of the particular PLMN, the UE 14 in some embodiments transmit this PLMN indication 28-2 within signalling 24. In one embodiment, the UE 14 includes the PLMN indication 28-2 within the resume request 26 itself, along with the resume identifier 22. In another embodiment, the UE 14 includes the PLMN indication 28-2 in a separate message from the request 26, e.g., in a resume complete message.

No matter how the target RAN node 12-2 receives the resume identifier 22 and PLMN indication 28-2 from the UE 14, the target RAN node 12-2 retrieves the context 18A for the connection 16 based on that resume identifier 22 and PLMN indication 28-2. Even if the RAN nodes 12-1 and 12-3 have the same RAN node identity, for instance, the target RAN node 12-2 selectively retrieves the context 18A for the connection 16 from the source RAN node 12-1 for PLMN A, not from RAN node 12-3 for PLMN B. Indeed, the association of PLMN A with the resume identifier 22 resolves any ambiguity that might exist regarding which RAN node 12-1 or 12-3 stores the context 18A for the connection 16.

In some embodiments, for example, the target RAN node 12-2 identifies, based on the resume identifier 22 and the indication 28-2 of the PLMN with which the resume identifier 22 is associated, an interface (e.g., an Xn interface) to a RAN node which maintains the context 18A for the connection 16. In one embodiment, for instance, the target RAN node 12-2 identifies the interface based on a mapping that associates different combinations of PLMN indications and resume identifiers (or PLMN-specific RAN node identities from which resume identifiers are formed) with different interfaces. In one example, then, the target RAN node 12-2 identifies the interface to the source RAN node 12-1 as being the interface to which is mapped a combination of the indication 28-2 of PLMN A and a PLMN-specific RAN node identity included in the resume identifier 22. Having identified this interface, the target RAN node 12-2 then retrieves the context 18A over that identified interface.

In other embodiments, the target RAN node 12-2 may determine, based on the resume identifier 22 and the indication 28-2 of the PLMN with which the resume identifier 22 is associated, that an interface to a RAN node which maintains the context 18A for the connection 16 is not available at the target RAN node 12-2. That is, the target RAN node 12-2 lacks an interface (e.g., an Xn interface) to the RAN node which maintains the context 18A. In this case, the target RAN node 12-2 may select, based on the indication 28-2 of the PLMN with which the resume identifier 22 is associated, a core network node (e.g., a node that implements an access and mobility function, AMF) that supports the PLMN with which the resume identifier 22 is associated (e.g., a node in CN16A for PLMN A). The target RAN node 12-2 may then transmit a request for the context 18A to the selected core network node. The target RAN node 12-2 may include the resume identifier 22 in the request. With any ambiguity attributable to different possible PLMNs having been resolving in this way by the target RAN node 12-2, the core network node for that PLMN then correspondingly retrieves the context 18A for the target RAN node 12-2 and forwards it to the target RAN node 12-2.

Some embodiments thereby advantageously enable context transfer in RAN sharing scenarios, even without inefficient coordination between PLMN operators (e.g., in terms of how the PLMN operators use their resume identifiers). This in turn proves advantageous in that, in some embodiments, the entire resume identifier remains available for independent use by each PLMN operator and thereby preserves the number of resume identifiers available for use by each PLMN operator. Alternatively or additionally, some embodiments enable context transfer in RAN sharing scenarios even without negative impact on UE performance. For example, some embodiments avoid unnecessary UE signalling that might otherwise be required to resolve the ambiguity regarding which RAN node stores its context. Avoiding this unnecessary UE signalling in turn minimizes UE battery consumption and service delays.

Note that the UE 14 may indicate the PLMN with which the resume identifier 22 is associated in any number of ways. In some embodiments, the PLMN indication 28-2 in this regard is a complete PLMN identity (PLMN ID) indicated explicitly in the signalling 24. In other embodiments, the PLMN indication 28-2 is an index of a specific PLMN identity in a list of PLMN identities, where each PLMN identity in the list has an associated index. This list of PLMN identities may be broadcast by the target RAN node 12-2, e.g., in or as part of system information or other common signalling.

Note further that the source RAN node 12-1 may in some embodiments store an indication 28-1 of the PLMN with which the resume identifier 22 is associated. The indication 28-1 stored by the source RAN node 12-1 may be the same as or different from the indication 28-2 used with respect to the target RAN node 12-2, e.g., the indications 28-1 and 28-2 may indicate the same PLMN but with different indices in an uncoordinated manner between the RAN nodes. As shown in FIG. 1 for example, the source RAN node 12-1 in some embodiments stores a PLMN indication 28-1 in the context 18A or in association with the context 18A (e.g., via the resume identifier 22). Alternatively or additionally, the source RAN node 12-1 may transmit the PLMN indication 28-1 to the UE 14, e.g., with dedicated signalling when the source RAN node 12-1 provides the UE 14 with the resume identifier 22. The source RAN node 12-1 may for instance include the PLMN indication 28-1 within the suspend message 20 along with the resume identifier 22, as shown in FIG. 1. In some embodiments where the indications 28-1 and 28-2 are different, the UE 14 may be configured to translate between the indications 28-1 and 28-2 when communicating with the different RAN nodes 12-1 and 12-2.

Note as well that, when initially creating the context 18A for the connection 16 (e.g., upon initial establishment of the connection 16), the source RAN node 12-1 in some embodiments stores an indication of the PLMN with which the connection 16 and/or context 18A is associated. The source RAN node 12-1 may for instance store such an indication in, or in association with, the context 18A itself. Where the PLMN associated with the connection 16 and/or context 18A is the PLMN with which the UE 14 is registered, for example, the source RAN node 12-1 may store the UE's registered PLMN in the context 18A in connection with initial creation of the context 18A. In these and other embodiments, the UE 14 may indicate the PLMN with which the requested connection 16 is to be associated in signalling used to request the initial establishment of that connection 16, e.g., within message 3 of a random access procedure. Then, when the connection 16 is later suspended, the source RAN node 12-1 in some embodiments uses this stored indication to generate the suspend message 20 to include the resume identifier 22 and PLMN indication 28-1 indicating the PLMN with which the resume identifier 22 is associated. Alternatively or additionally, if the source RAN node 12-1 is the target RAN node 12-2 at which the UE 14 requests resumption of the connection 16, the source RAN node 12-1 may identify the PLMN with which the resume identifier 22 is associated based on the indication stored in or in association with the context 18A, e.g., such that in some embodiments the UE 14 need not include the PLMN indication 28-2 in the signalling 24 requesting resumption of the connection 14.

Other embodiments herein avoid or resolve similar ambiguities that may exist with respect to a UE identifier included in a paging message for identifying the target UE of the page. Such a paging message may in fact be what triggers the UE 14 in FIG. 1 to request resumption of its connection at the target RAN node 12-2.

Figure 2:
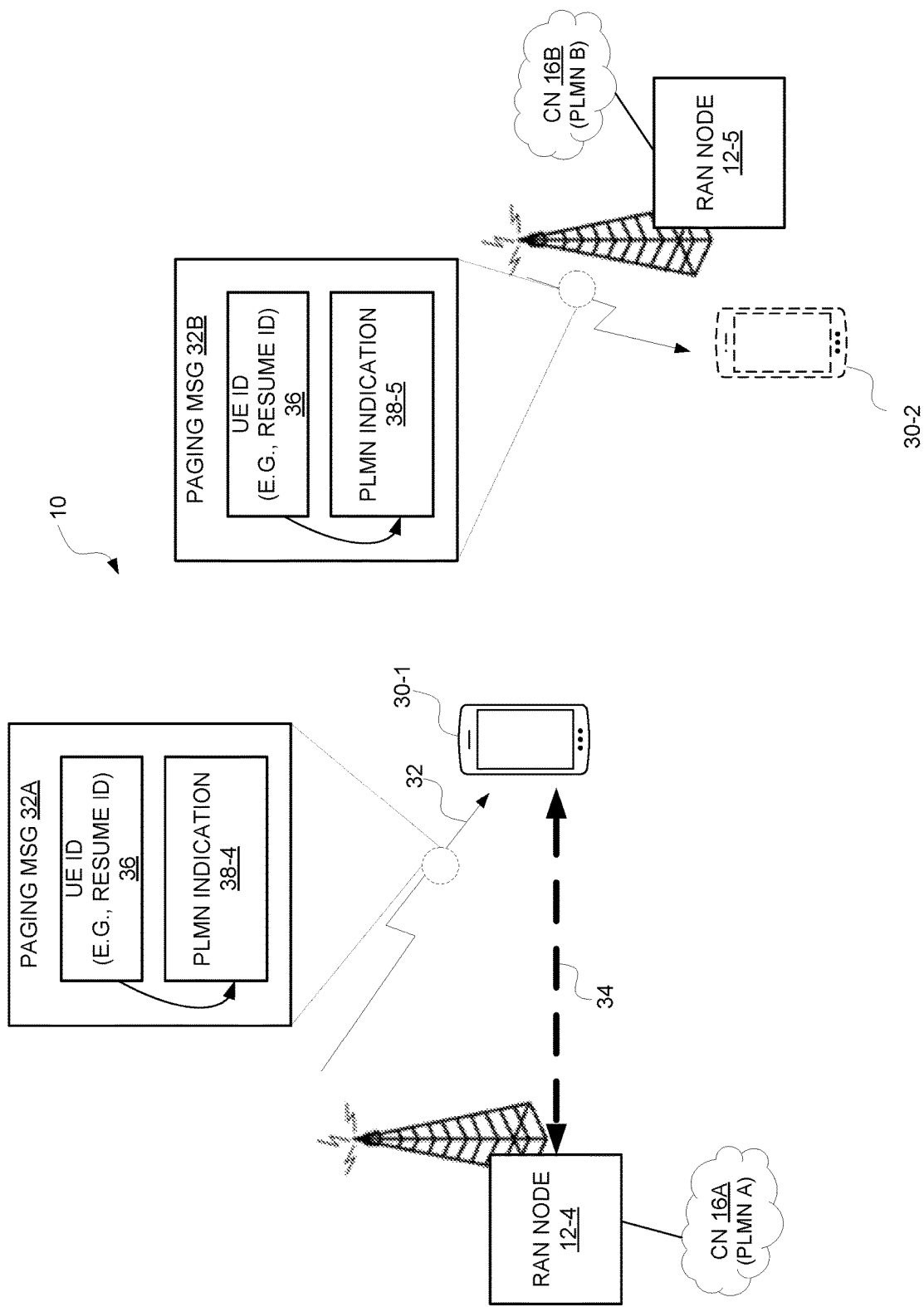
FIG. 2 is a block diagram of a wireless communication system that includes a user equipment and RAN nodes according to other embodiments.

Regardless, as shown in FIG. 2, a UE 30-1 listens for a paging message 32A while the UE 30-1 is in a suspended state or an idle state with respect to a RAN node 12-4 for PLMN A. In the suspended state, a connection 34 between the UE 30-1 and RAN node 12-4 is suspended. In the idle state, by contrast, the connection 34 is released. Where the connection 34 is an RRC connection for instance the suspended state may be referred to as RRC_INACTIVE and the idle state may be referred to as RRC_IDLE. Regardless, from listening for such a paging message, the UE 30-1 as shown receives a paging message 32A that includes a UE identifier 36 which identifies a target UE of the paging message 32A.

In some embodiments, the UE identifier 36 is specific to a certain PLMN, meaning that the UE identifier 36 is unique only within a certain PLMN. It is not globally unique across multiple PLMNs. For example, in some embodiments, the UE identifier 36 has an addressing space shared by different PLMNs. Effectively, different PLMNs have the same set of UE identifiers usable for identifying UEs. In fact, particularly in embodiments where the connection 34 corresponds to the connection 16 in FIG. 1 that has been suspended, the paging message 32A may includes the resume identifier 22 discussed above as the UE identifier 36. In this case, then, the UE identifier 36 inherits the same ambiguities discussed above with respect to the resume identifier 22. In this and other cases, then, unless the PLMN operators divide or coordinate their usage of UE identifiers, different UEs may be identified using the same UE identifier and thereby create ambiguity regarding which UE is to respond to the paging message 32A. For example, another RAN node 12-5 for PLMN B as shown in FIG. 2 may identify a different UE 30-2 using the same UE identifier 36. This means that the UE identifier 36 itself may not unambiguously indicate to the UE 30-1 which UE is the target of the paging message 32A.

Some embodiments herein facilitate paging in these and other scenarios by associating the UE identifier 36 with a PLMN. As shown in FIG. 2, for instance, the RAN node 12-4 generates the paging message 32A to include an indication 38-4 of a PLMN associated with the UE identifier 36. The UE 30-1 determines, based on the UE identifier 36 and the PLMN indication 38-4, whether the UE 30-1 is the target UE of the paging message 32A. By basing this determination on both the UE identifier 36 and the PLMN indication 38-4, the UE 30-1 is able to successfully decipher whether it is the intended target, even if RAN node 12-5 were to transmit its own paging message 32B to UE 30-2 with the same UE identifier 36, because that paging message 32B would have an indication 38-5 for PLMN B instead. The UE 30-1 thereafter replies or refrains from replying to the paging message 32A depending respectively on whether or not the UE 30-1 is the target UE of the page.

Some embodiments thereby advantageously enable paging in RAN sharing\and other scenarios, even without inefficient coordination between PLMN operators (e.g., in terms of how the PLMN operators use their UE identifiers). This in turn proves advantageous in that, in some embodiments, the entire UE identifier remains available for independent use by each PLMN operator and thereby preserves the number of UE identifiers available for use by each PLMN operator. Alternatively or additionally, some embodiments enable paging in RAN sharing and other scenarios even without negative impact on UE performance. For example, some embodiments avoid unnecessary UE signalling that might otherwise be required to resolve the ambiguity regarding which UE is the intended target of a page. Avoiding this unnecessary UE signalling in turn minimizes UE battery consumption and service delays.

Note that in some embodiments the RAN node 12-4 receives the paging message 32A from another RAN node (e.g., a source RAN node that stores a context for the UE 30-1) or from a core network node in CN 16A (e.g., a core network node via which paging of the UE 30-1 is relayed). In some embodiments, for instance, the paging message 32A a core network node in the form of a node that implements an access and mobility function (AMF). Embodiments herein thereby further include a RAN node or core network node generating and/or transmitting paging message 32A to RAN node 12-4, where that paging message 32A includes UE ID 36 as well as PLMN indication 38-4.

Note also that the PLMN indication 38-4 in FIG. 2 may indicate the PLMN associated with the UE identifier 36 in any of the ways described above with respect to the PLMN indication 28-1 and 28-2 in FIG. 1.

Note also that, in some embodiments, different RAN nodes or cells may indicate the same PLMN with different indications, e.g., in an uncoordinated manner. For example, one RAN node or cell may indicate the PLMN associated with the UE's connection (e.g., the UE's registered PLMN) using an index of 5 (with reference to the list of PLMNs broadcasted by the RAN node or in the cell). Another RAN node or cell however may indicate the same PLMN using an index of 3. In some embodiments, then, a UE stores or otherwise tracks which indications (e.g., indices) correspond to the PLMN associated with the UE's connection in different RAN nodes or cells. For example, the UE may store the full PLMN ID of that PLMN as well as information indicating that the full PLMN ID corresponds to different indices in different RAN nodes or cells.

In these and other embodiments, then, the source RAN node 12-1 in FIG. 1 may use a different index to PLMN mapping than the target RAN node 12-2. For example, the source RAN node 12-1 may include index 5 as the PLMN indication 28-1 in the suspend message 20 to the UE 14, where index 5 at the source RAN node 12-1 is mapped to PLMN A. The target RAN node 12-2 however maps index 3 to PLMN A. With knowledge of this, the UE 14 may instead use index 3 as the PLMN indication 28-2 in the signalling 24 to the target RAN node 12-2 to resume the connection. Similarly, where the target RAN node 12-2 pages the UE during the suspended connection (such that the target RAN node 12-2 is the RAN node 12-4 in FIG. 2), the UE 14 may receive a paging message 32A with index 3 as the PLMN indication 38-4.

Although embodiments herein have been described with respect to an RRC connection, embodiments herein are extendable to other types of connections. Some embodiments for example extend to any type of control plane connection or signalling connection between the wireless device 14 and the radio network node 12.

Figure 3:
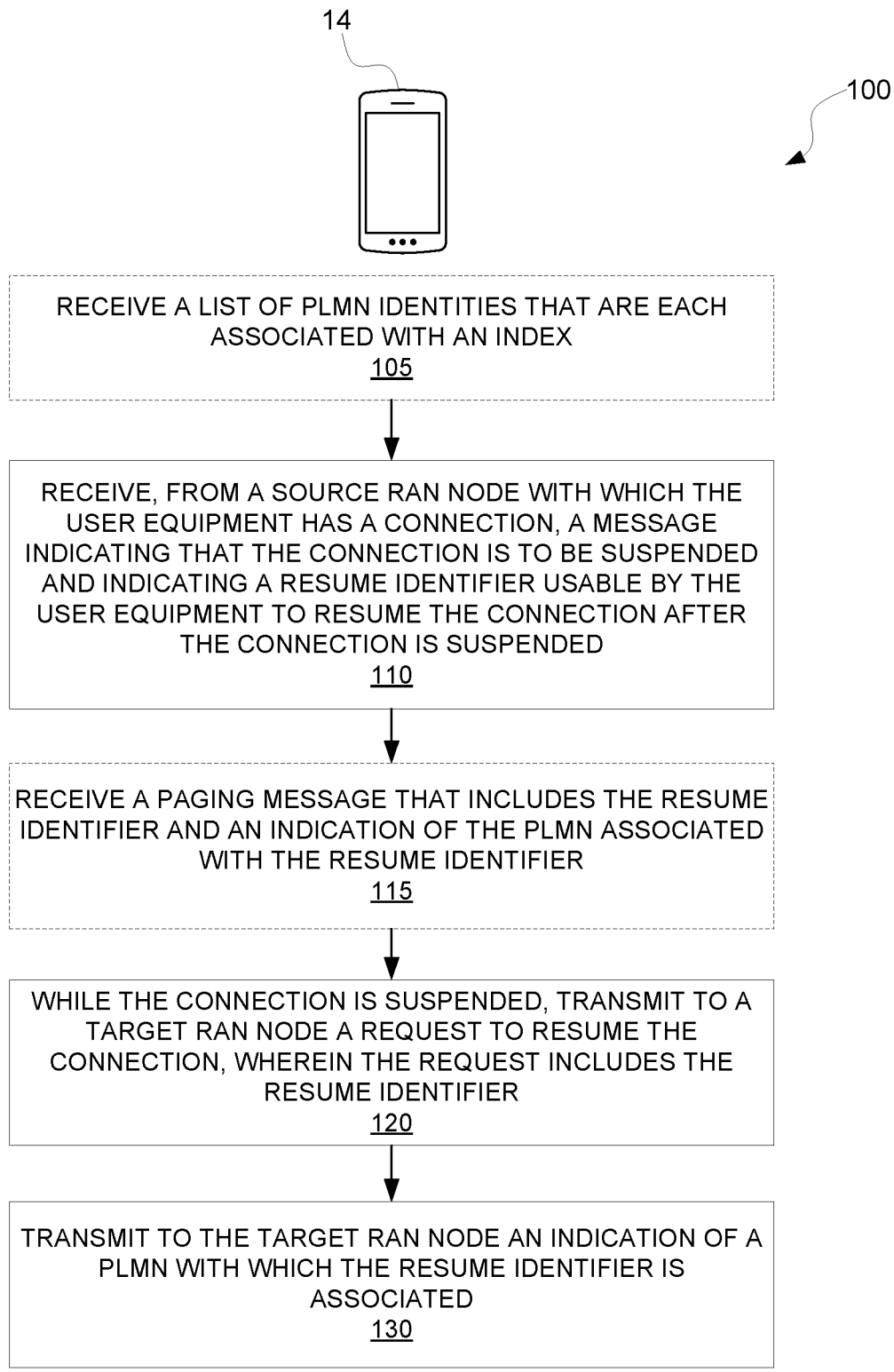
FIG. 3 is a logic flow diagram of a method performed by a user equipment according to some embodiments.

In view of the above modifications and variations, FIG. 3 shows a method 100 performed by a user equipment 14 according to some embodiments. As shown, the method 100 comprises receiving at the user equipment 14, from a source RAN node 12-1 with which the user equipment 14 has a connection 16, a message 20 indicating that the connection 16 is to be suspended and indicating a resume identifier 22 usable by the user equipment 14 to resume the connection 16 after the connection 16 is suspended (Block 110). In some embodiments, the resume identifier 22 is associated with a RAN node identity that identifies, using a RAN node addressing space shared by different PLMNs, a RAN node which maintains a context 18A for the connection 16 while the connection 16 is suspended. Alternatively or additionally, different PLMNs in some embodiments have the same set of resume identifiers usable by user equipments to resume suspended connections.

Regardless, the method 100 as shown also includes, while the connection 16 is suspended, transmitting from the user equipment 14 to a target RAN node 12-2 a request 26 to resume the connection 16 (Block 120). The request 26 includes the resume identifier 22. The method 100 further includes transmitting from the user equipment 14 to the target RAN node 12-2 an indication 28-2 of a PLMN with which the resume identifier 22 is associated (Block 130). For example, the user equipment 14 may transmit the indication 28-2 within the request 26 or within a separate message. In some embodiments, the indication 28-2 of a PLMN with which the resume identifier 22 is associated is an indication of a PLMN with which the user equipment 14 is registered or an indication of a PLMN selected by the user equipment 14. Regardless, in some embodiments, the user equipment 14 transmits the request 26 and/or the indication 28-2 responsive to receiving a paging message 32A that includes the resume identifier 22 and an indication 28-4 of the PLMN associated with the resume identifier 22 (Block 115). As discussed above, this indication 28-4 may be the same or different than the indication 28-2 but both indications 28-2 and 28-4 indicate the same PLMN; namely, the PLMN associated with the resume identifier 22 or UE identifier.

The indication 28-2 of the PLMN with which the resume identifier 22 is associated in some embodiments is a complete PLMN identity (PLMN ID). In other embodiments, the method 100 includes receiving (e.g., in system information) a list of PLMN identities that are each associated with an index (Block 105). In this case, the indication 28-2 may be an index of a specific PLMN identity in the list of PLMN identities.

Although not shown, the method 100 may also include, before transmitting the request 26 to resume the connection 16, receiving from the source RAN node 12-1 a message 20 indicating that the connection 16 is to be suspended and indicating the resume identifier 22 usable by the user equipment 14 to resume the connection 16 after the connection 16 is suspended. The method 100 may further comprise receiving from the source RAN node 12-1 an indication 28-1 of the PLMN with which the resume identifier 22 is associated. The indication 28-1 may for instance be included in the message 20. Also as discussed above, this indication 28-1 may be the same or different than the indication 28-2 but both indications 28-1 and 28-2 indicate the same PLMN; namely, the PLMN associated with the resume identifier 22.

Note that in some embodiments, transmission of the request to resume the connection 16 may be conditional on the PLMN with which the resume identifier 22 is associated being available and/or the UE's registered PLMN being available. When the PLMN with which the resume identifier 22 is associated is not available and/or the UE's registered PLMN is not available, the method 100 may instead comprise leaving a suspended state in which the connection 16 is suspended and/or going to an idle state in which the connection 16 is released. The method 100 in some embodiments may then include requesting establishment of a new connection (e.g., a new RRC connection).

Figure 4:
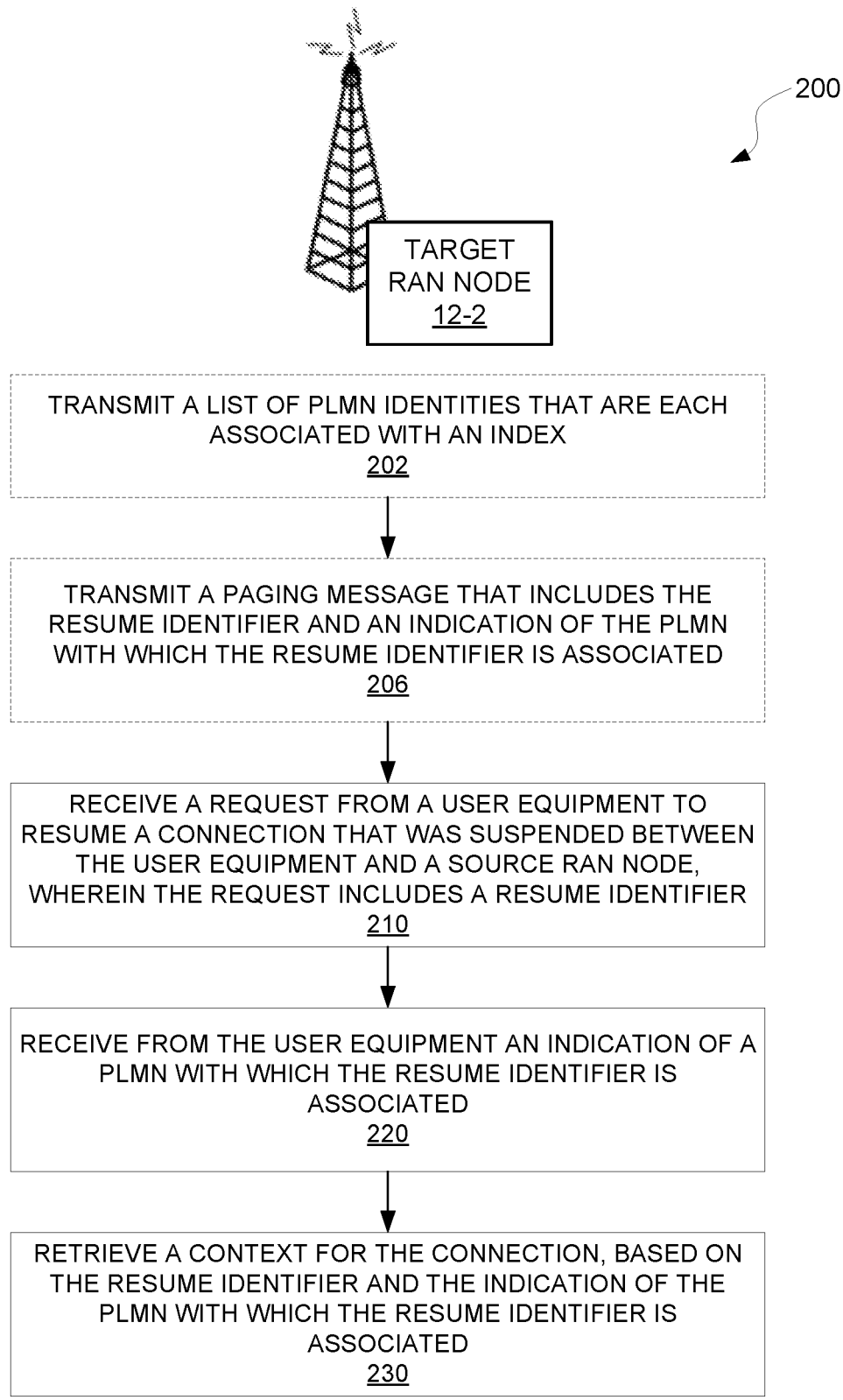
FIG. 4 is a logic flow diagram of a method performed by a target RAN node according to some embodiments.

FIG. 4 illustrates a method 200 performed by a RAN node configured to operate as a target RAN node according to some embodiments. The method 200 comprises receiving at the target RAN node 12-1 a request 26 from a user equipment 14 to resume a connection 16 that was suspended between the user equipment 14 and a source RAN node 12-1 (Block 210). The request 26 includes a resume identifier 22. In some embodiments, the resume identifier 22 is associated with a RAN node identity that identifies, using a RAN node addressing space shared by different PLMNs, a RAN node which maintains a context 18A for the connection 16 while the connection 16 is suspended. Alternatively or additionally, different PLMNs in some embodiments have the same set of resume identifiers usable by user equipments to resume suspended connections.

Regardless, the method 200 as shown also includes receiving at the target RAN node 12-1, from the user equipment 14, an indication 28-2 of a PLMN with which the resume identifier 22 is associated (Block 220). For example, the target RAN node 12-1 may receive the indication 28-2 within the request 26 or within a separate message. In some embodiments, the indication 28-2 of a PLMN with which the resume identifier 22 is associated is an indication of a PLMN with which the user equipment 14 is registered or an indication of a PLMN selected by the user equipment 14. Regardless, in some embodiments, the target RAN node 12-2 receives the request 26 and/or the indication 28-2 responsive to transmitting a paging message 32A that includes the resume identifier 22 and the indication 28-2 of the PLMN associated with the resume identifier 22 (Block 206).

The indication 28-2 of the PLMN with which the resume identifier 22 is associated in some embodiments is a complete PLMN identity (PLMN ID). In other embodiments, the method 200 includes transmitting (e.g., in system information) a list of PLMN identities that are each associated with an index (Block 202). In this case, the indication 28-2 may be an index of a specific PLMN identity in the list of PLMN identities.

In any event, the method 200 as shown further includes retrieving by the target RAN node 12-2 a context 18A for the connection 16, based on the resume identifier 22 and the indication 28-2 of the PLMN with which the resume identifier 22 is associated (Block 230). In some embodiments, for example, such retrieval comprises identifying, based on the resume identifier 22 and the indication 28-2 of the PLMN with which the resume identifier 22 is associated, an interface to a RAN node which maintains the context 18A for the connection 16. In this case, the target RAN node 12-2 retrieves, over the identified interface, the context 18A for the connection 16.

In other embodiments, such retrieval comprises determining, based on the resume identifier 22 and the indication 28-2 of the PLMN with which the resume identifier 22 is associated, that an interface to a RAN node which maintains the context 18A for the connection 16 is not available at the target RAN node 12-2. In this case, retrieval may entail selecting, based on the indication 28-2 of the PLMN with which the resume identifier 22 is associated, a core network node that supports the PLMN with which the resume identifier 22 is associated. Retrieval may then involve transmitting a request for the context 18A to the selected core network node. This request includes the resume identifier 22.

Figure 5:
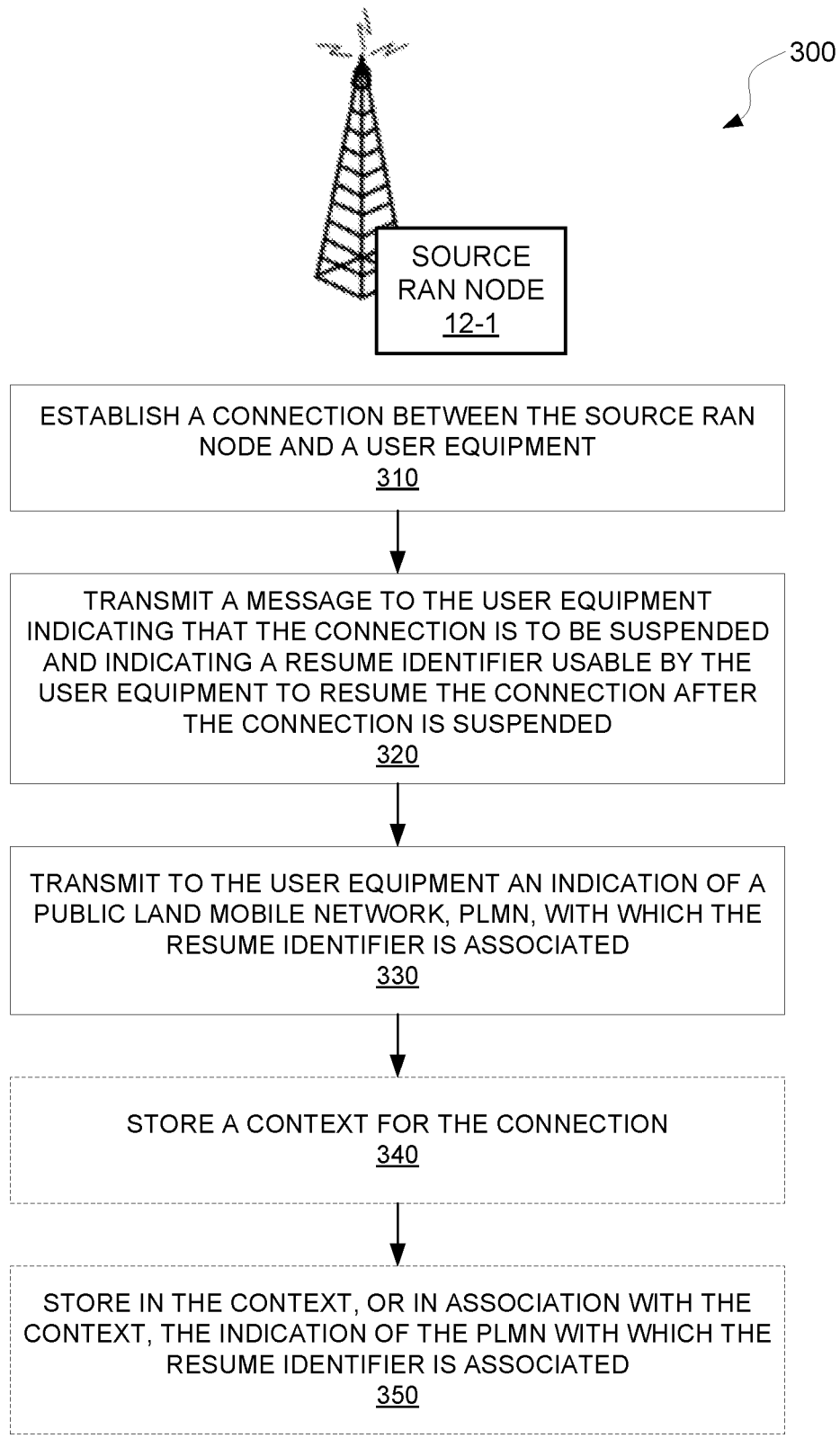
FIG. 5 is a logic flow diagram of a method performed by a source RAN node according to some embodiments.

FIG. 5 illustrates a method 300 performed by a RAN node configured to operate as a source RAN node 12-1 according to some embodiments. As shown, the method 300 comprises establishing a connection 16 between the source RAN node 12-1 and a user equipment 14 (Block 310). The method 300 also comprises transmitting from the source RAN node 12-1 a message 20 to the user equipment 14 indicating that the connection 16 is to be suspended and indicating a resume identifier 22 usable by the user equipment 14 to resume the connection 16 after the connection 16 is suspended (Block 320). The method 300 further comprises transmitting from the source RAN node 12-1 to the user equipment 14 an indication 28-1 of a PLMN with which the resume identifier 22 is associated (Block 330). The indication 28-1 may for instance be included in the message 20. In some embodiments, the indication 28-1 of a PLMN with which the resume identifier 22 is associated is an indication of a PLMN with which the user equipment 14 is registered or an indication of a PLMN selected by the user equipment 14.

The indication 28-1 of the PLMN with which the resume identifier 22 is associated in some embodiments is a complete PLMN identity (PLMN ID). In other embodiments not shown, the method 300 includes transmitting (e.g., in system information) a list of PLMN identities that are each associated with an index. In this case, the indication 28-1 may be an index of a specific PLMN identity in the list of PLMN identities.

In some embodiments, the method 300 further comprises storing a context 18A for the connection 16, e.g., even while the connection 16 is suspended (Block 340). The method 300 may further comprise storing in the context 18A, or in association with the context 18A, the indication 28-1 of the PLMN with which the resume identifier 22 is associated (Block 350).

Figure 6:
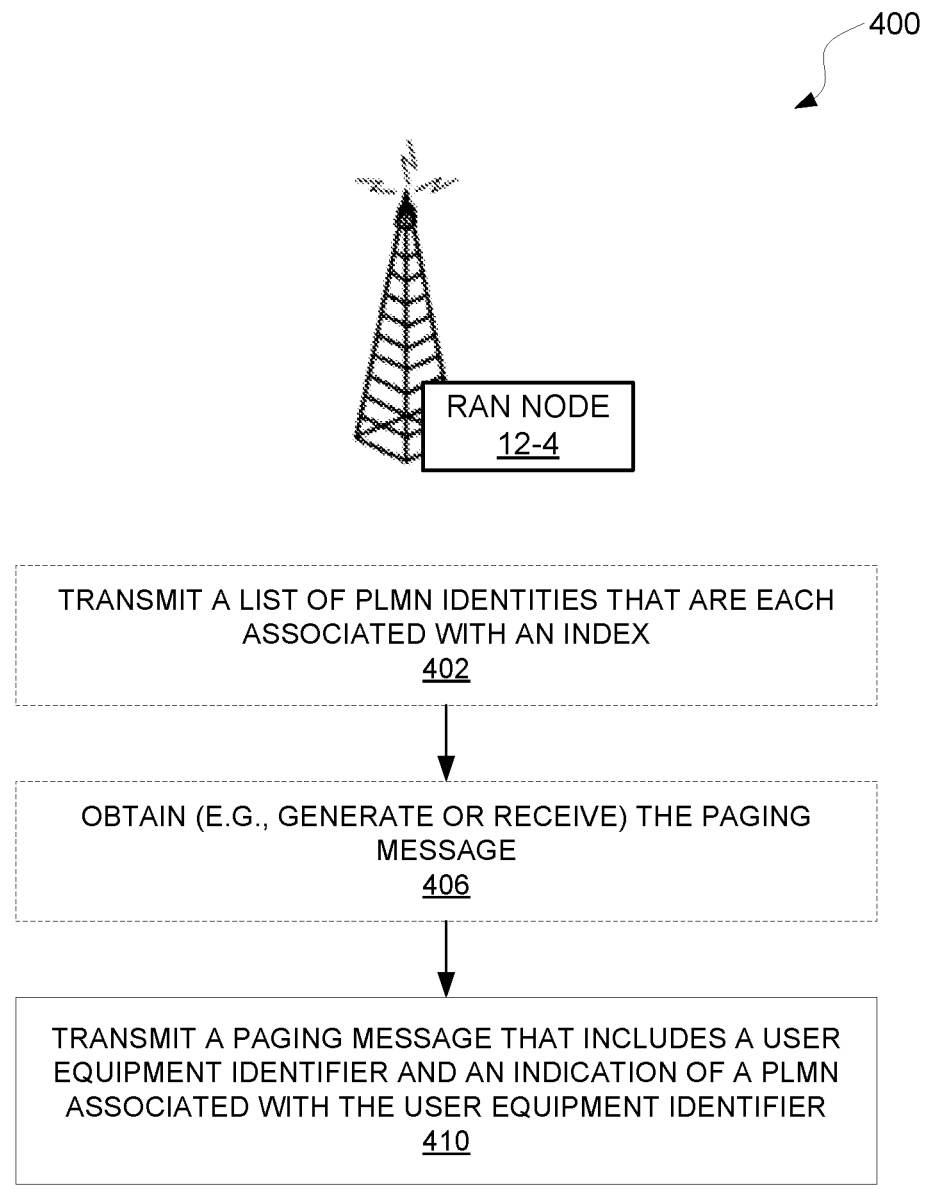
FIG. 6 is a logic flow diagram of a method performed by a RAN node according to other embodiments.

FIG. 6 illustrates a method 400 performed by a RAN node 12-4 according to still other embodiments. As shown, the method 400 includes transmitting a paging message 32A that includes a user equipment identifier 36 and an indication 38-4 of a PLMN associated with the user equipment identifier 36 (Block 410). The paging message 32A may for instance be transmitted over a radio interface to the user equipment to which the paging message 32A is directed. Or, the paging message 32A may be transmitted to another RAN node or a core network node via which the paging message 32A is to be relayed, for forwarding to the user equipment.

In some embodiments, the RAN node 12-4 transmits the paging message 32A while a connection 16 with the user equipment to which the paging message 32A is directed is in a suspended state. In this case, the user equipment identifier 36 may be the resume identifier 22 discussed above, such that the indication 38-4 is an indication 28-1 or 28-2 of a PLMN with which the resume identifier 22 is associated. In this case, the RAN node 12-4 may be the same as the target RAN node 12-2 or the source RAN node 12-1 in FIG. 1.

In some embodiments, the indication 38-4 of a PLMN with which the user equipment identifier 36 is associated is an indication of a PLMN with which the user equipment 30-1 is registered or an indication of a PLMN selected by the user equipment 30-1. In any event, the indication 38-4 of the PLMN with which the user equipment identifier 36 is associated in some embodiments is a complete PLMN identity (PLMN ID). In other embodiments, the method 400 includes transmitting (e.g., in system information) a list of PLMN identities that are each associated with an index (Block 402). In this case, the indication 38-4 may be an index of a specific PLMN identity in the list of PLMN identities.

FIG. 6 also shows that in some embodiments the method 400 may include obtaining (e.g., receiving or generating) the paging message 32A (Block 406). In one embodiment for instance the RAN node 12-4 itself generates the paging message 32A. In other embodiments, the RAN node 12-4 receives the paging message 32A from another RAN node (e.g., that stores the context 18A for the connection 16) or from a core network node (e.g., a node implementing an AMF) such as a core network node via which paging is relayed.

Figure 7:
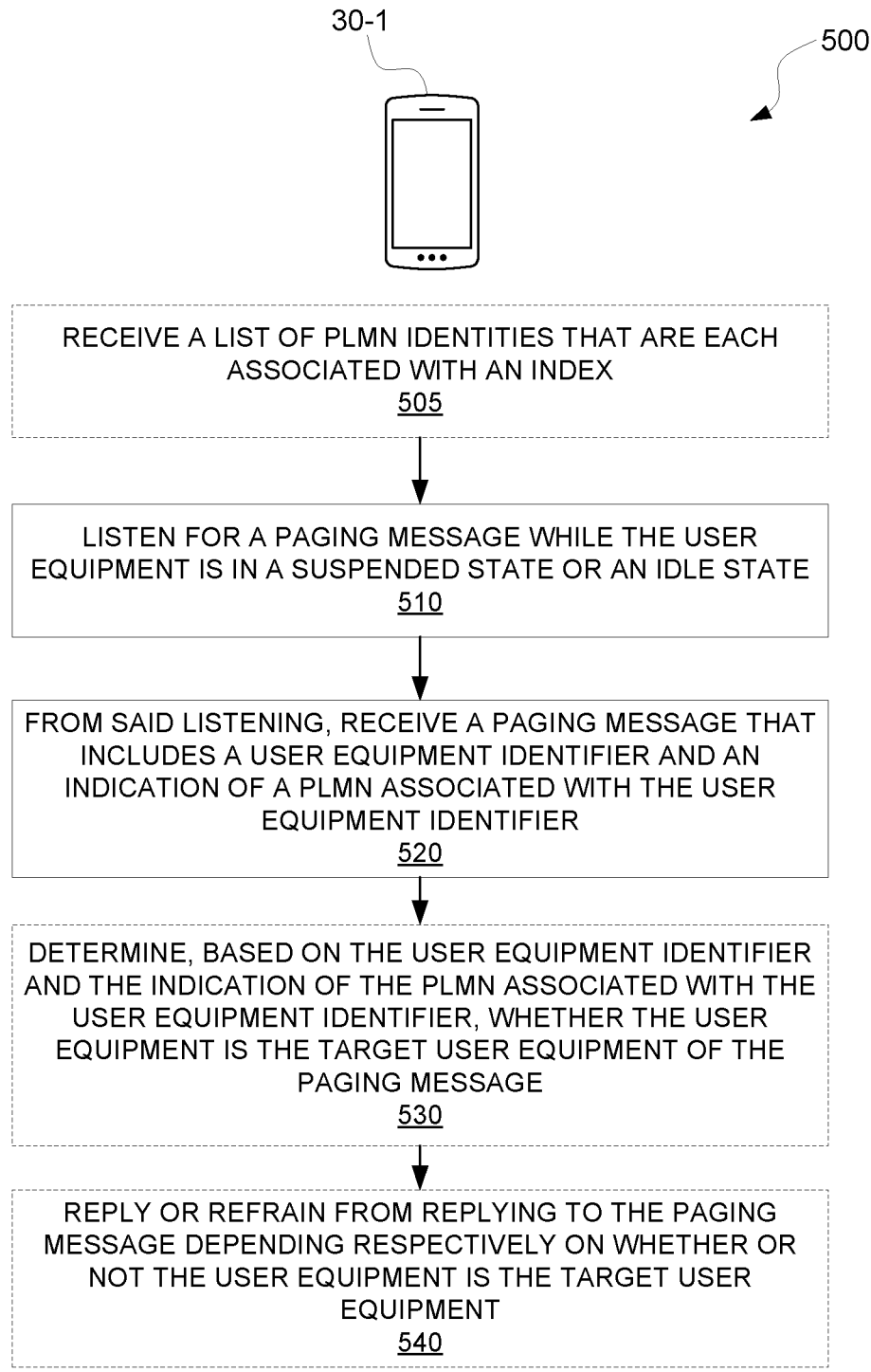
FIG. 7 is a logic flow diagram of a method performed by a user equipment according to other embodiments.

FIG. 7 shows a method 500 performed by a user equipment 30-1 according to some embodiments. As shown, the method 500 includes listening for a paging message 32A while the user equipment 30-1 is in a suspended state or an idle state (Block 510). In the suspended state, a connection 34 between the user equipment 30-1 and RAN node 12-4 is suspended. In the idle state, by contrast, the connection 34 is released. Where the connection 34 is an RRC connection for instance the suspended state may be referred to as RRC_INACTIVE and the idle state may be referred to as RRC_IDLE. Regardless, from listening for such a paging message, the method 500 as shown further includes receiving a paging message 32A that includes a user equipment identifier 36 which identifies a target UE of the paging message 32A and that includes an indication 38-4 of a PLMN associated with the user equipment identifier 36 (Block 520).

In some embodiments, the user equipment 30-1 receives the paging message 32A while a connection 16 between a RAN node 14-4 and the user equipment 30-1 is in a suspended state. In this case, the user equipment identifier 36 may be the resume identifier 22 discussed above, such that the indication 38-4 is an indication 28-1 or 28-2 of a PLMN with which the resume identifier 22 is associated. In this case, the RAN node 12-4 may be the same as the target RAN node 12-2 or the source RAN node 12-1 in FIG. 1.

In some embodiments, the indication 38-4 of a PLMN with which the user equipment identifier 36 is associated is an indication of a PLMN with which the user equipment 30-1 is registered or an indication of a PLMN selected by the user equipment 30-1. In any event, the indication 38-4 of the PLMN with which the user equipment identifier 36 is associated in some embodiments is a complete PLMN identity (PLMN ID). In other embodiments, the method 500 includes receiving (e.g., in system information) a list of PLMN identities that are each associated with an index (Block 505). In this case, the indication 38-4 may be an index of a specific PLMN identity in the list of PLMN identities.

In some embodiments, the UE identifier 36 is specific to a certain PLMN, meaning that the UE identifier 36 is unique only within a certain PLMN. It is not globally unique across multiple PLMNs. For example, in some embodiments, the UE identifier 36 has an addressing space shared by different PLMNs. Effectively, then, different PLMNs in these embodiments have the same set of UE identifiers usable for identifying UEs.

Regardless, the method 500 as shown in some embodiments further includes determining, based on the user equipment identifier 36 and the indication 38-4 of the PLMN associated with the user equipment identifier 36, whether the user equipment 30-1 is the target user equipment of the paging message 32A (Block 530). In this case, the method may further comprise replying or refraining from replying to the paging message 32A depending respectively on whether or not the user equipment is the target user equipment (Block 540).

Note that the user equipment 14 or 30-1 described above may perform the methods herein and any other processing by implementing any functional means, modules, units, or circuitry. In one embodiment, for example, the user equipment 14 or 30-1 comprises respective circuits or circuitry configured to perform the steps shown in FIGS. 3 and/or 7. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8A:
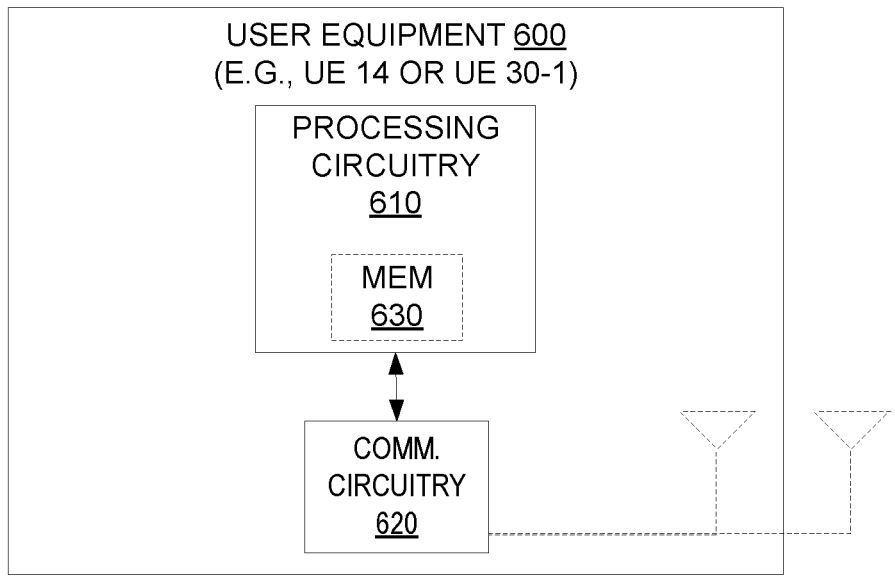
FIG. 8A is a block diagram of a user equipment according to some embodiments.

FIG. 8A for example illustrates a user equipment 600 as implemented in accordance with one or more embodiments. The user equipment 600 may be UE 14 in FIG. 1 or UE 30-1 in FIG. 2. As shown, the user equipment 600 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the user equipment 600. The processing circuitry 610 is configured to perform processing described above (e.g., in FIGS. 3 and/or 7), such as by executing instructions stored in memory 630. The processing circuitry 610 in this regard may implement certain functional means, units, or modules.

Figure 8B:
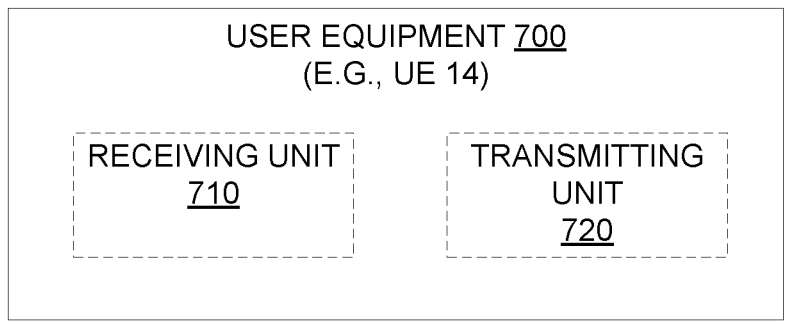
FIG. 8B is a block diagram of a user equipment according to other embodiments.

FIG. 8B illustrates a schematic block diagram of a user equipment 700 according to still other embodiments. The user equipment 700 may be for instance the UE 14 in FIG. 1. As shown, the user equipment 700 implements various functional means, units, or modules, e.g., via the processing circuitry 610 in FIG. 8A and/or via software code. These functional means, units, or modules, e.g., for implementing the method 100 in FIG. 3, include for instance a receiving unit 710 for receiving at the user equipment 700, from a source RAN node 12-1 with which the user equipment 700 has a connection 16, a message 20 indicating that the connection 16 is to be suspended and indicating a resume identifier 22 usable by the user equipment 700 to resume the connection 16 after the connection 16 is suspended. Also included is a transmitting unit 720 for, while the connection 16 is suspended, transmitting from the user equipment 700 to a target RAN node 12-2 a request 26 to resume the connection 16. The request 26 includes the resume identifier 22. The transmitting unit 720 may also be for transmitting from the user equipment 700 to the target RAN node 12-2 an indication 28-2 of a PLMN with which the resume identifier 22 is associated.

Figure 8C:
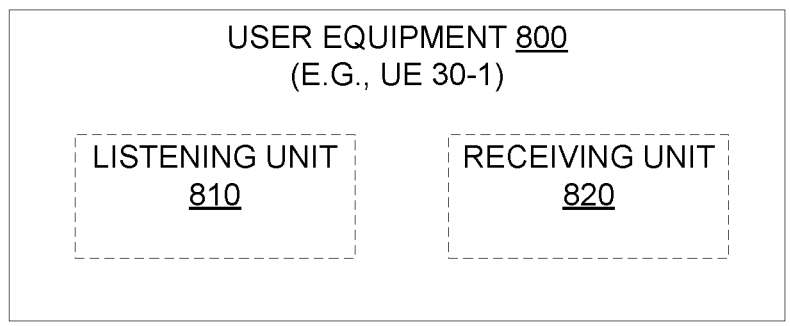
FIG. 8C is a block diagram of a user equipment according to still other embodiments.

FIG. 8C illustrates a schematic block diagram of a user equipment 800 according to still other embodiments. The user equipment 800 may be for instance the UE 30-1 in FIG. 2. As shown, the user equipment 800 implements various functional means, units, or modules, e.g., via the processing circuitry 610 in FIG. 8A and/or via software code. These functional means, units, or modules, e.g., for implementing the method 500 in FIG. 7, include for instance a listening unit 810 for listening for a paging message 32A while the user equipment 800 is in a suspended state or an idle state. Also included may be a receiving unit 820 for, from listening for such a paging message, receiving a paging message 32A that includes a user equipment identifier 36 which identifies a target UE of the paging message 32A and that includes an indication 38-4 of a PLMN associated with the user equipment identifier 36.

Note also that the RAN node 12-1, 12-2, or 12-4 described above may perform the methods herein and any other processing by implementing any functional means, modules, units, or circuitry. In one embodiment, for example, the RAN node 12-1, 12-2, or 12-4 comprises respective circuits or circuitry configured to perform the steps shown in FIGS. 4, 5, and/or 6. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9A:
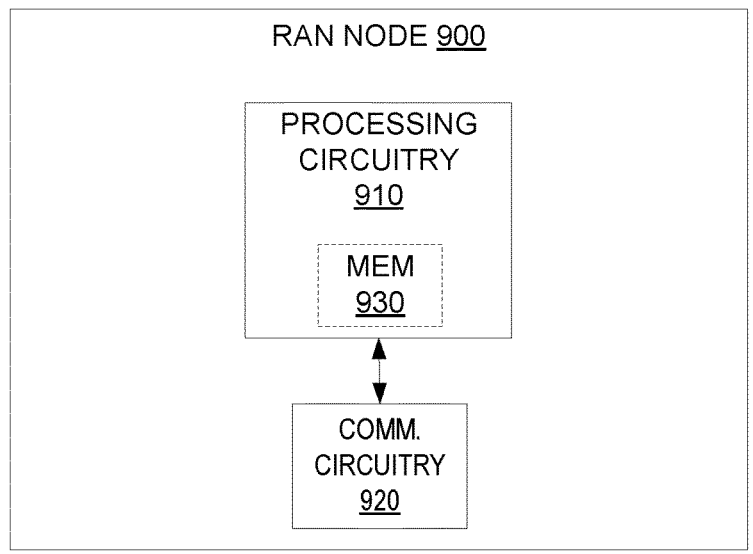
FIG. 9A is a block diagram of a RAN node according to some embodiments.

FIG. 9A more particularly illustrates a RAN node 900 as implemented in accordance with one or more embodiments. The RAN node 900 may be the RAN node 12-1, 12-2, or 12-4 as described above. As shown, the RAN node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above (e.g., in FIGS. 4, 5, and/or 6), such as by executing instructions stored in memory 930. The processing circuitry 910 in this regard may implement certain functional means, units, or modules.

Figure 9B:
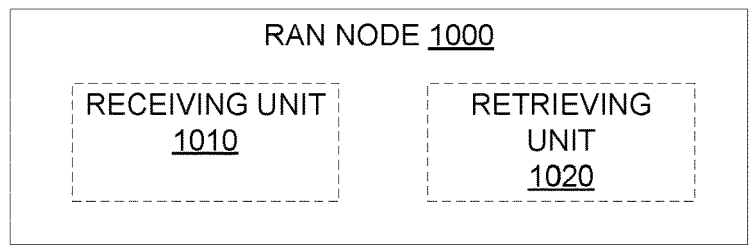
FIG. 9B is a block diagram of a RAN node according to other embodiments.

FIG. 9B for example illustrates a schematic block diagram of a RAN node 1000 according to still other embodiments. The RAN node 1000 may be for instance target RAN node 12-2 in FIG. 1. As shown, the RAN node 1000 implements various functional means, units, or modules, e.g., via the processing circuitry 910 in FIG. 9A and/or via software code. These functional means, units, or modules, e.g., for implementing the method in FIG. 4, include for instance a receiving unit 1010 for receiving at the RAN node 1000 a request 26 from a user equipment 14 to resume a connection 16 that was suspended between the user equipment 14 and a source RAN node 12-1. The request 26 includes a resume identifier 22. The receiving unit 1010 may also be for receiving at the RAN node 1000, from the user equipment 14, an indication 28-2 of a PLMN with which the resume identifier 22 is associated. Also included may be a retrieving unit 1020 for retrieving by the RAN node 1000 a context 18A for the connection 16, based on the resume identifier 22 and the indication 28-2 of the PLMN with which the resume identifier 22 is associated.

Figure 9C:
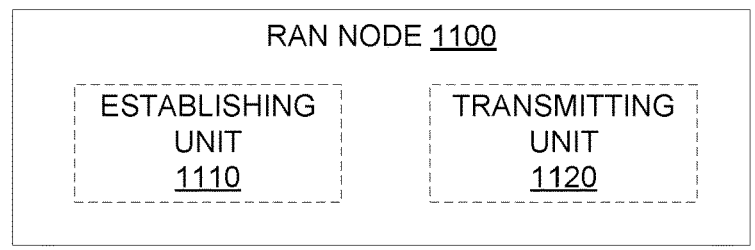
FIG. 9C is a block diagram of a RAN node according to still other embodiments.

FIG. 9C illustrates a schematic block diagram of a RAN node 1100 according to yet other embodiments. The RAN node 1100 may be for instance source RAN node 12-1 in FIG. 1. As shown, the RAN node 1100 implements various functional means, units, or modules, e.g., via the processing circuitry 910 in FIG. 9A and/or via software code. These functional means, units, or modules, e.g., for implementing the method in FIG. 5, include for instance an establishing unit 1110 for establishing a connection 16 between the RAN node 1100 and a user equipment 14. Also included is a transmitting unit 1120 for transmitting from the RAN node 1100 a message 20 to the user equipment 14 indicating that the connection 16 is to be suspended and indicating a resume identifier 22 usable by the user equipment 14 to resume the connection 16 after the connection 16 is suspended. The transmitting unit 1120 may also be for transmitting from the RAN node 1100 to the user equipment 14 an indication 28-1 of a PLMN with which the resume identifier 22 is associated.

Figure 9D:
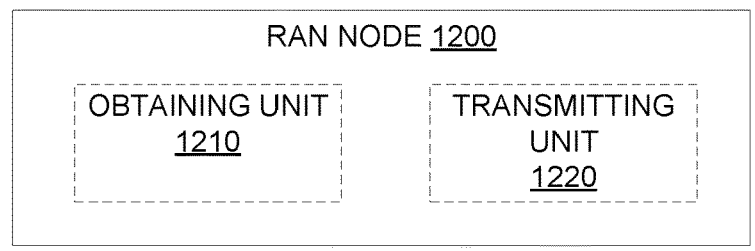
FIG. 9D is a block diagram of a RAN node according to yet other embodiments.

FIG. 9D illustrates a schematic block diagram of a RAN node 1200 according to other embodiments. The RAN node 1200 may be for instance RAN node 12-4 in FIG. 2. As shown, the RAN node 1200 implements various functional means, units, or modules, e.g., via the processing circuitry 910 in FIG. 9A and/or via software code. These functional means, units, or modules, e.g., for implementing the method in FIG. 6, include for instance a transmitting unit 1220 for transmitting a paging message 32A that includes a user equipment identifier 36 and an indication 38-4 of a PLMN associated with the user equipment identifier 36. Also included may be an obtaining unit 1210 for obtaining (e.g., generating or receiving) the paging message 32A.

Those skilled in the art will also appreciate that embodiments herein further include corresponding computer programs.

For example, embodiments herein include a computer program that comprises instructions which, when executed on at least one processor of a user equipment 14 or 30-1, cause the user equipment 14 or 30-1 to carry out any of the respective processing described above. A computer program in this regard may comprise one or more code modules corresponding to the means or units described above.

Other embodiments herein include a computer program that comprises instructions which, when executed on at least one processor of a RAN node 12-1, 12-2, or 12-4, cause the RAN node 12-1, 12-2, or 12-4 to carry out any of the respective processing described above. A computer program in this regard may comprise one or more code modules corresponding to the means or units described above.

Embodiments further include a carrier containing any of these computer programs. This carrier may comprise one of an electronic signal, optical signal, radio signal, or computer readable storage medium.

In this regard, embodiments herein also include a non-transitory computer readable (storage or recording) medium comprising instructions that, when executed by a processor of user equipment 14 or 30-1, cause the user equipment 14 or 30-1 to perform as described above. Embodiments further include a non-transitory computer readable (storage or recording) medium comprising instructions that, when executed by a processor of RAN node 12-1, 12-2, or 12-4 cause the RAN node 12-1, 12-2, or 12-4 to perform as described above.

Additional embodiments will now be described. At least some of these embodiments may be described as applicable in certain contexts and/or wireless network types for illustrative purposes, but the embodiments are similarly applicable in other contexts and/or wireless network types not explicitly described.

In the context of the 5G specification effort, 3GPP decided to introduce a new RRC Inactive state. The state has, among others, the following properties. First, the UE Context is stored in the RAN. This UE Context is used at subsequent RRC_INACTIVE to RRC_CONNECTED transition. The stored UE context may include information about UE security context, data radio bearers, connected slices, UE capabilities etc. Second, the RRC Inactive state implicates a RAN paging procedure. In this procedure, the RAN node that the UE was last connected to pages the UE over an area consisting of one or more cells, supported by one or more RAN nodes.

Figure 10:
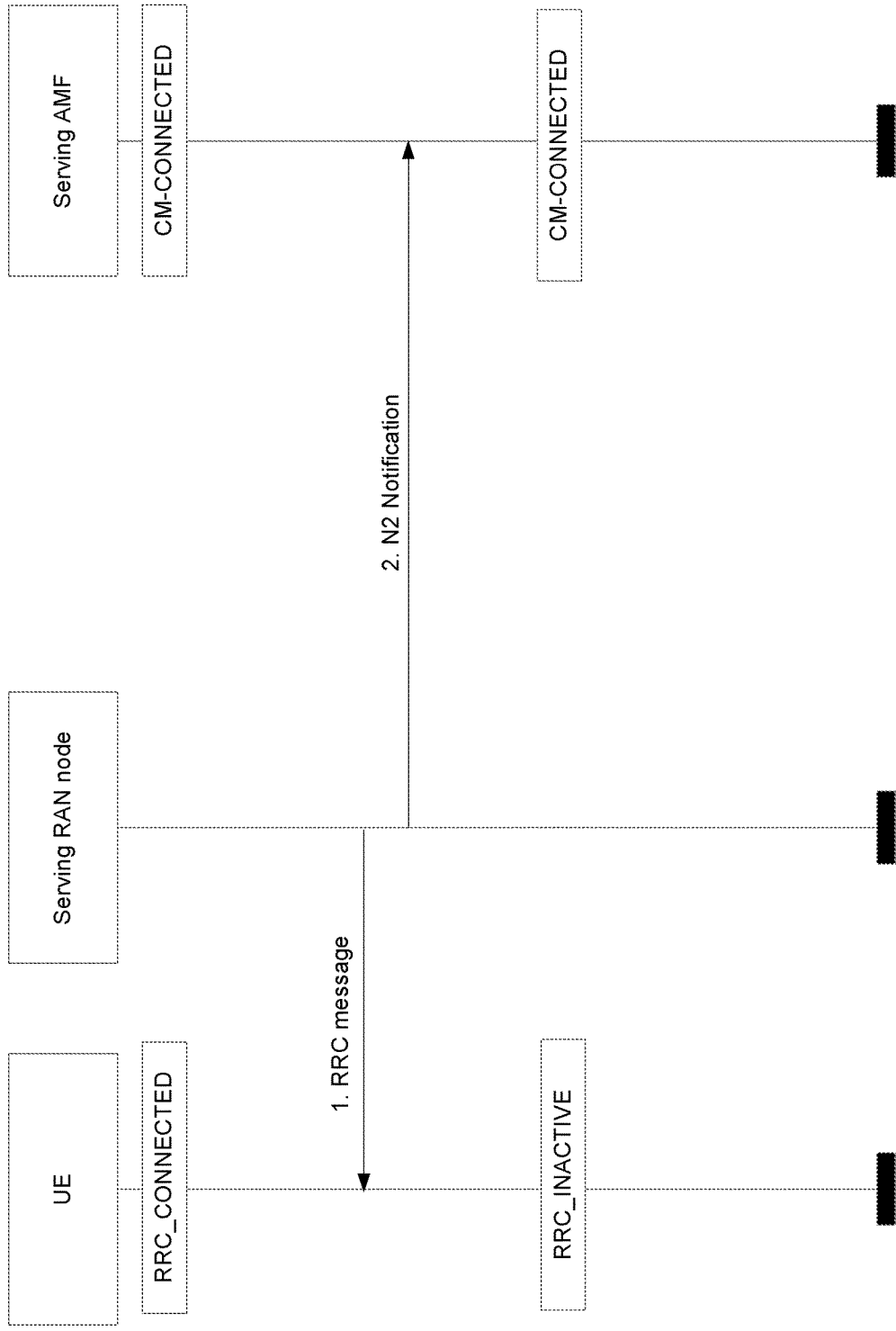
FIG. 10 is a call flow diagram of a an RRC Connected to RRC Inactive state transition procedure according to some embodiments.

The UE Context can be stored in a RAN node serving the UE before/at the transition from RRC_CONNECTED to RRC_INACTIVE state. This RRC Connected to RRC Inactive transition is shown in FIG. 10, which is reproduced from figure 4.8.x1-1 in a change request (CR) to 3GPP TS 23.502.

The Connection Suspend procedure is used by the network to suspend the RRC connection and perform a RRC Connected to RRC Inactive state transition if the UE and the network support RRC Inactive state (see TS 38.300 and TS 38.413).

In Step 1, the RAN sends to the UE an RRC message with a Resume ID. The RAN initiates the transition to the RRC Inactive state (see TS 38.300) providing the UE with its Resume ID. UE remains in CM-CONNECTED state. The N2AP association as well as N3 user plane resources are kept established. Data related to the N2AP association, UE Context and N3 user plane resources, necessary to resume the connection is kept in the RAN.

In Step 2, the RAN sends to the AMF an N2 Notification (Inactive). The RAN in this regard notifies the AMF that the UE's RRC state is moved to RRC Inactive state. The N2AP association as well as N3 user plane resources are kept established. Data related to the N2AP association, UE Context and N3 user plane resources is kept in the AMF. AMF state remains CM-CONNECTED.

In step 1 above, the RAN provides the UE with a UE RAN identity referred to in this document as a Resume ID. This identifier is associated with the UE Context of that UE stored in RAN.

At a subsequent transition from RRC_INACTIVE to RRC_CONNECTED state, the UE presents the Resume ID to the RAN. The RAN uses the Resume ID to locate and access the UE Context stored in step 1.

As described in a CR to 3GPP TS 23.502, 4.8.x2, the Connection Resume procedure is used by the UE to resume the RRC connection and to perform RRC Inactive to RRC Connected state transition. This procedure may be used if the UE and the network support RRC Inactive state (see TS 38.300) and the UE has stored the necessary information to conduct the Connection Resume procedure (see TS 38.413) otherwise the Service Request procedure is used, see clause 4.2.3.2 of 3GPP TS 23.502.

Figure 11:
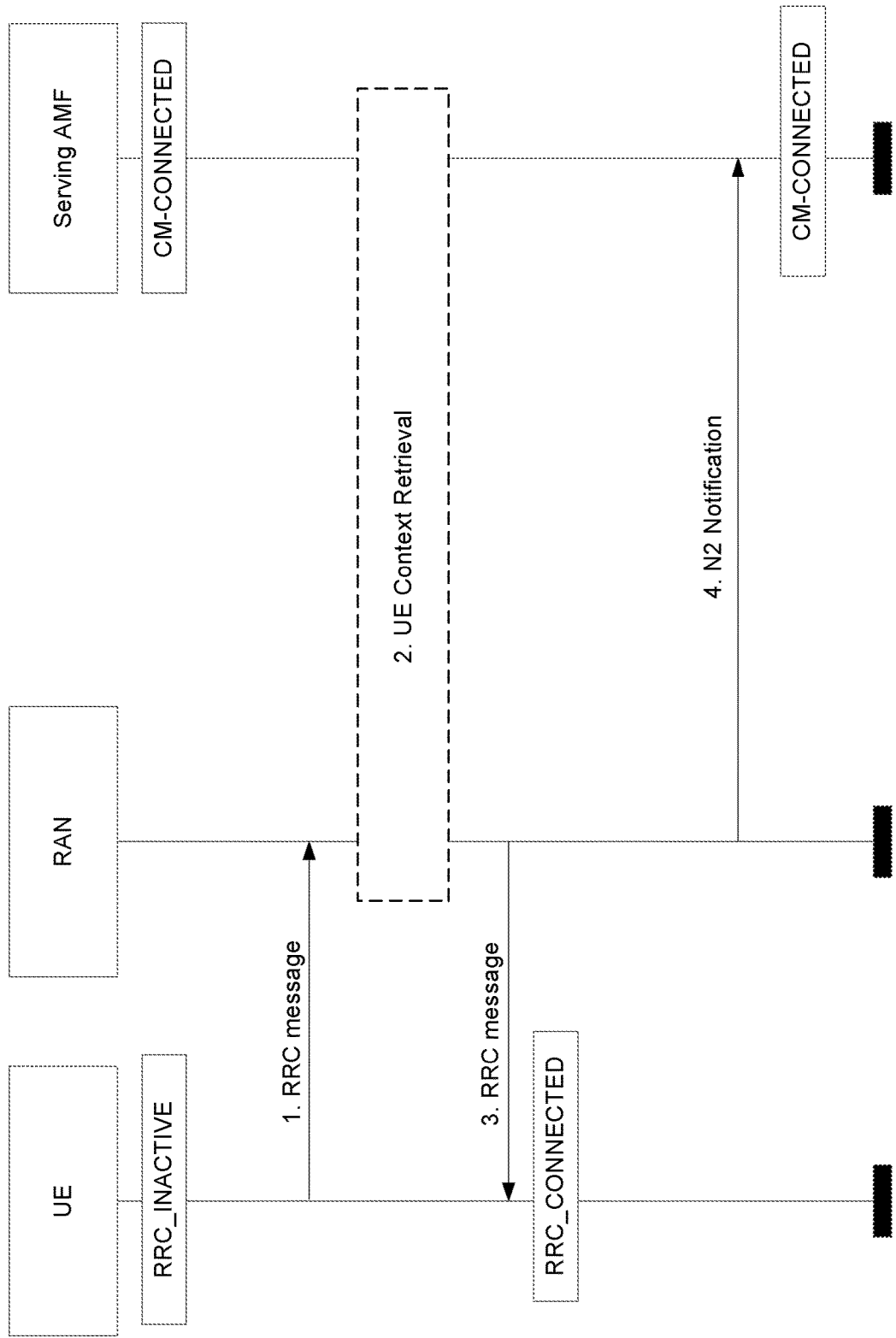
FIG. 11 is a call flow diagram of an RRC Inactive to RRC Connected state transition procedure according to some embodiments.

FIG. 11 shows the RRC Inactive to RRC Connected state transition, e.g., as described in Figure 4.8.x2-1 in a CR to 3GPP TS 23.502. In Step 1, the UE sends to the RAN an RRC message (Resume ID). The UE in this regard initiates the transition from RRC Inactive state to RRC Connected state, see TS 38.300. The UE provides its Resume ID needed by the RAN to access the UE's stored Context.

In Step 2, which is conditional, the RAN performs UE Context Retrieval. UE Context Retrieval is performed when the UE Context associated with the UE attempting to resume its connection is not locally available at the accessed RAN. The UE Context Retrieval procedure via radio access network is specified in TS 38.423. The UE Context Retrieval procedure via the core network is specified in sub-clause x.y.z and in TS 38.413.

In Step 3, the RAN sends to the UE an RRC message with the Resume ID. The RAN in this regard confirms to the UE that the UE has entered RRC Connected state.

In Step 4, the RAN sends to the AMF an N2 Notification (Connected) The RAN in this regard notifies the AMF that the UE entered RRC Connected state.

As outlined in step 1, the RAN uses the Resume ID to locate and access the UE Context. Given a subsequent RRC_INACTIVE to RRC_CONNECTED transition attempted by the UE can occur at a different RAN than was serving the UE at previous RRC_CONNECTED to RRC_INACTIVE transition, the UE Context can be stored at a different RAN than the RAN node accessed by the UE. This is described in step 2. If the new RAN is different from the old RAN where the UE has entered RRC_INACTIVE state and thus where the UE Context is stored, there is a need to locate the old_RAN to be able to retrieve the UE Context so that it can be accessed and used by the new_RAN.

To enable the location of the Resume ID, the Resume ID contains an identifier allowing the new_RAN to locate the old_RAN.

Figure 12:
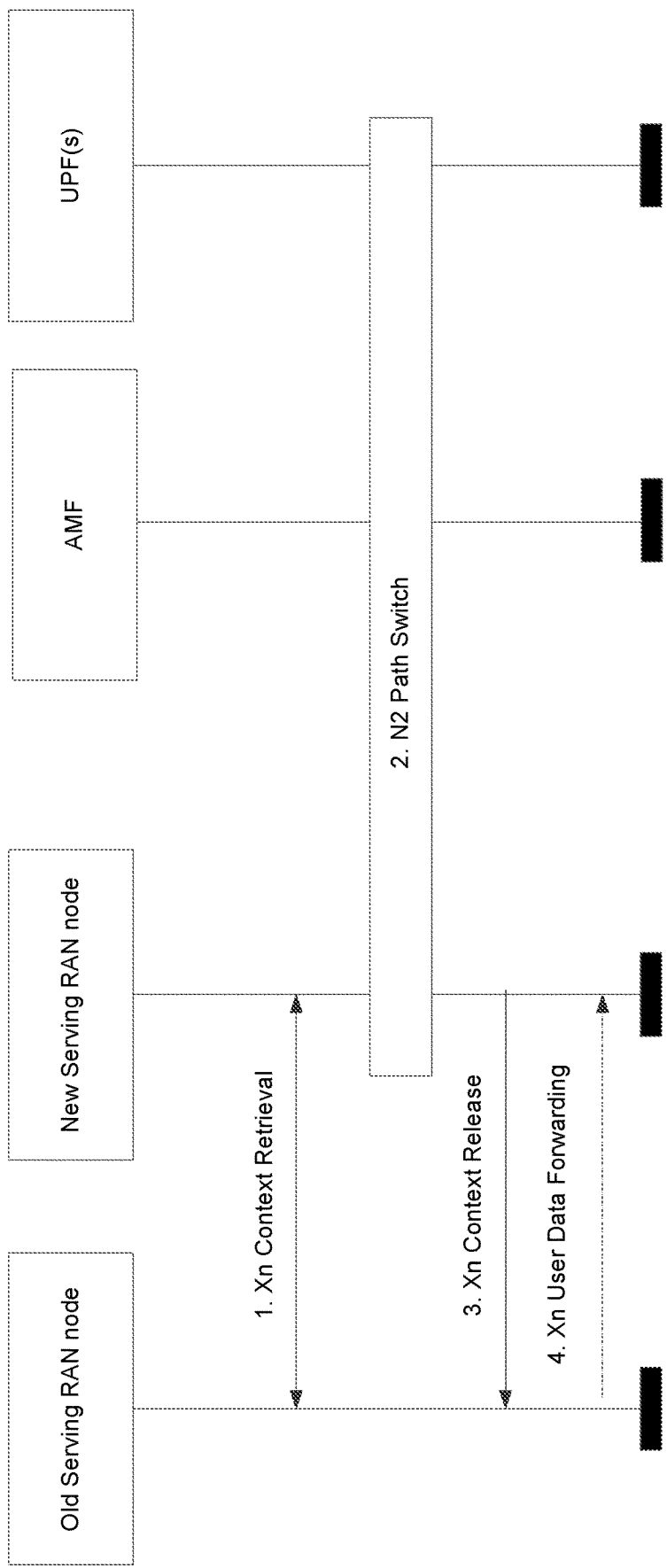
FIG. 12 is a call flow diagram of a procedure to retrieve a UE Context via a RAN according to some embodiments.
Figure 13:
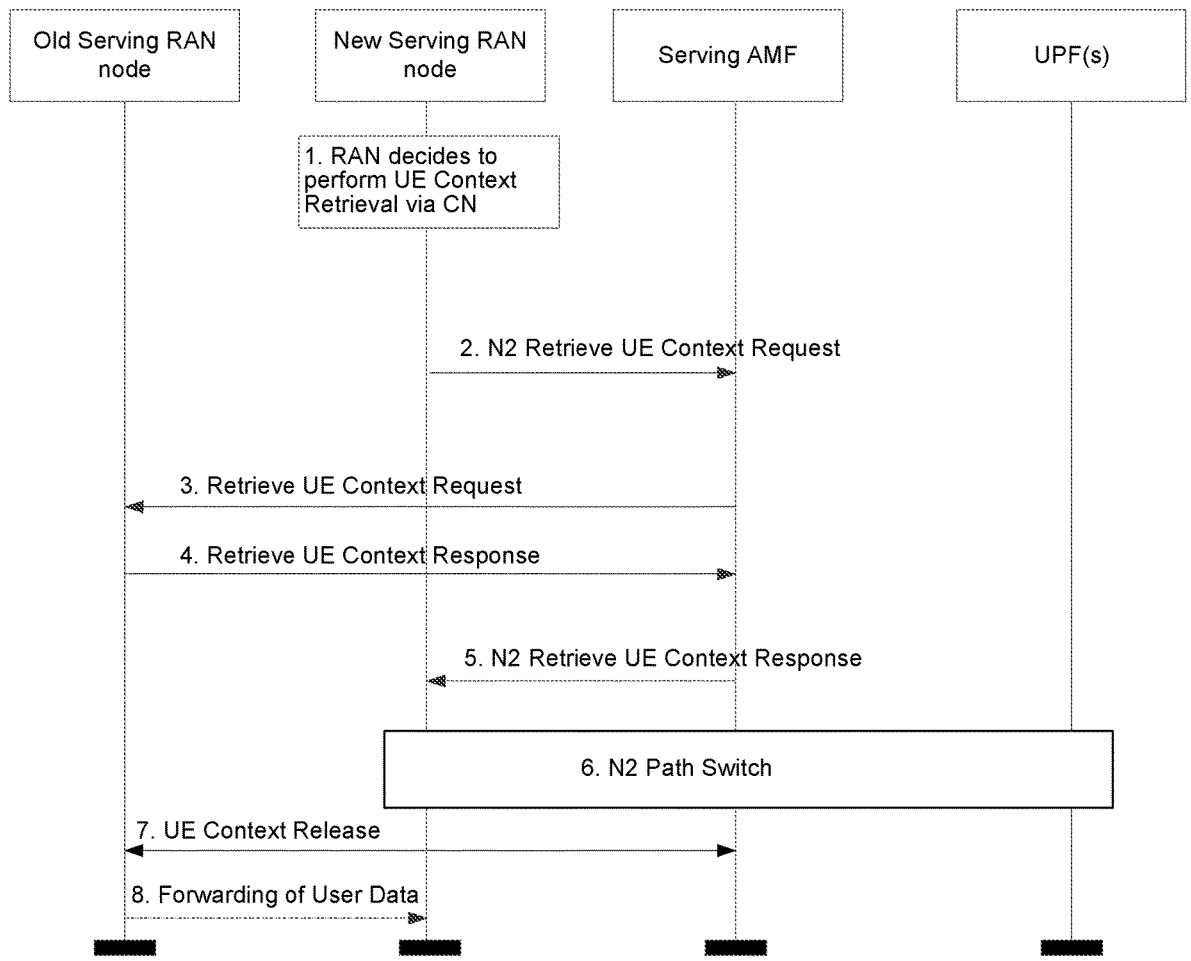
FIG. 13 is a call flow diagram of a procedure to retrieve a UE Context via a 5G CN according to some embodiments.

For completeness, procedures to retrieve the UE Context via RAN and via 5G CN are included in FIGS. 12 and 13 respectively.

As shown in FIG. 12, t4.8.x3 UE Context Retrieval via the radio access network

The UE Context Retrieval via the radio access network procedure is used if the UE in RRC Inactive state requests to resume a connection toward a new RAN while the UE Context is stored at Old Serving RAN, and the UE Context can be retrieved from the Old Serving RAN node by means of Xn signalling (only).

In Step 1, the New Serving RAN node retrieves the UE Context from the Old Serving RAN by using the Xn Retrieve UE Context procedure. If the Old Serving RAN node is able to resolve the Resume ID, it provides UE Context data to the New Serving RAN node.

In Step 2, the New Serving RAN performs the N2 Path Switch procedure towards the AMF.

In Step 3, the New Serving RAN node requests the Old Serving RAN node to release the UE Context. This message contains Downlink forwarding addresses for the user data buffered at Old Serving RAN nodes.

In Step 4, the Old Serving RAN forwards to the New Serving RAN pending DL user data.

As shown in FIG. 13, the UE Context Retrieval via the 5GC procedure is used if the UE in RRC Inactive state requests to resume a connection toward a new RAN while the UE Context is stored at Old Serving RAN, and the UE Context can not be retrieved from the Old Serving RAN node due to lack of Xn interface between the New and the Old Servin RAN node.

In Step 1, the New Serving RAN node realises that it has no Xn connection to a RAN node with the identity indicated in the Resume ID and decides to perform the Context Retrieval via Core Network procedure. In Step 2, the RAN sends to the AMF an N2 Retrieve UE Context Request (Old RAN ID (contained in the Resume ID), Resume ID, new RAN ID). The RAN in this regard requests an AMF within a pool to which it is connected, to resolve the RAN node identity. This AMF node doesn't necessarily need to be the AMF serving the UE. Respective signalling is performed in a connection-less and the AMF stateless manner. If the AMF is able to resolve the address of the indicated Old RAN ID, it forwards the request to that node.

In Step 3, the AMF sends to the Old Serving RAN a Retrieve UE Context Request (Old RAN ID, New RAN ID, Resume ID). The AMF forward the request to the Old Serving RAN.

In Step 4, the Old Serving RAN sends to the AMF a Retrieve UE Context Response (Old RAN ID, New RAN ID, Resume ID, UE Context). The Old Serving RAN node provides UE Context Data.

In Step 5, the AMF sends to the RAN an N2 Retrieve UE Context Response (Resume ID, UE Context). The AMF forwards the information received in step 4 to the New Serving RAN.

In Step 6, the RAN performs with respect to the AMF an N2 Path Switch (no Xn indicator, DL forwarding address). The New Serving RAN node triggers the path switch procedure as if it would have received UE context data via Xn interface and indicates to the AMF that no Xn connection is available towards the Old Serving RAN node. The message also contains the DL forwarding addresses.

In Step 7, the AMF performs with respect to the Old Serving RAN an N2 UE Context Release. The AMF node performs the N2 UE Context Release procedure (as the New Serving RAN node is not able to trigger it via Xn) and provides the DL forwarding addresses for the user plane data.

In Step 8, if necessary, forwarding of user data takes place.

Figure 14:
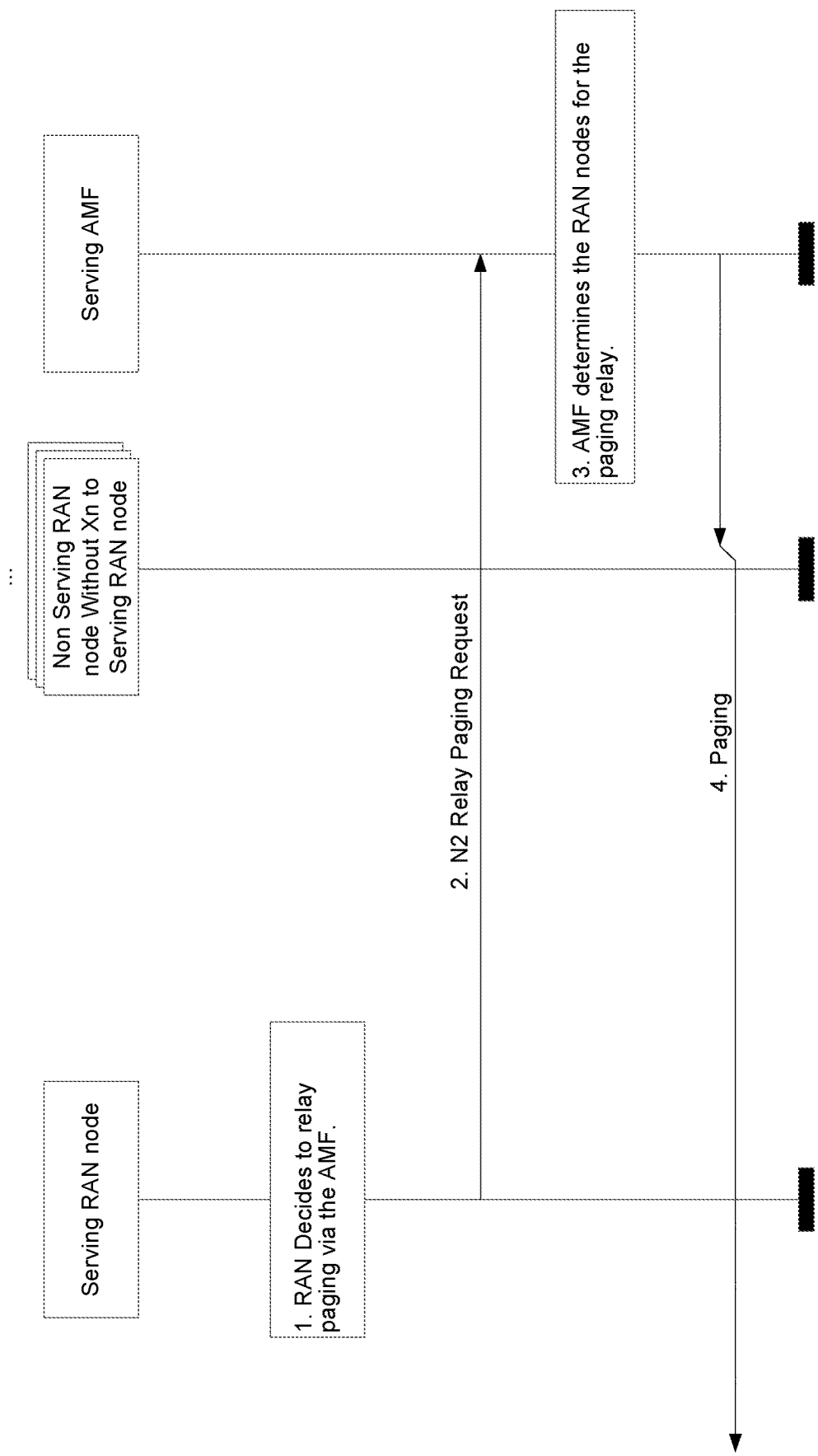
FIG. 14 is a call flow diagram of a procedure used by a RAN to page a UE via the 5GC according to some embodiments.

FIG. 14 shows the RAN Paging Relay via the 5GC.

The RAN Paging Relay via the 5GC procedure used by RAN to page a UE in RRC Inactive state over RAN nodes being in UE's Registration Area, e.g. including the RAN nodes towards which the Serving RAN node has no Xn interfaces established.

In Step 1, the serving RAN node decides to relay the paging via the 5GC.

In Step 2, the Serving RAN sends to the AMF an N2 Relay Paging Request (N2 Paging, Registration Area). The serving RAN node requests the serving AMF to relay the paging message to the RAN nodes in UE's Registration Area.

In Step 3, the AMF, based on received UE's Registration Area, selects the RAN nodes to which the paging message will be relayed. The AMF will not trigger paging repetition on its own.

In Step 4, the AMF sends to the RAN N2 Paging. The AMF in this regard relays Paging to the RAN nodes in UE's Registration Area.

It is agreed by 3GPP that a UE in RRC_INACTIVE state can be paged by the RAN using a UE RAN identifier. It is assumed that it will be the same identifier as used for the location of the UE Context, i.e. UE's Resume ID.

But there currently exists certain challenge(s). The Resume ID is assumed to consist of the: (i) RAN node identity where the UE Context is stored; and (ii) the UE identity in the RAN node where the UE Context is stored. That is, Resume ID:<RAN node id><UE id>.

Accordingly, the RAN node identity is currently unique in a given PLMN, i.e. different PLMNs re-use the same addressing space. In a RAN Sharing scenario, though, the RAN nodes are shared among different operators having their own CN and their own PLMN identities. The latter are broadcast by RAN in the system information. The RAN identity used for the shared RAN nodes need to be unique for both operators to avoid any confusion in the addressing of the shared RAN node. To achieve this a globally unique RAN identity can be used consisting of (i) PLMN identity; (ii) RAN node identity, so as to form a globally unique RAN node identity:<PLMN id><RAN node id>.

The problem is that since the Resume ID only uses the PLMN-specific RAN node id there is a risk for ambiguity in scenarios where the operators are sharing part of their network.

For example, two different UEs could be connected to two different PLMNs in two different RAN nodes which use the same RAN node ID. These RAN nodes may then allocate the same Resume ID (Resume ID A) to the different UEs since they both use the same RAN node id. If these two PLMNs are sharing a RAN node which one of the UEs enter and use the Resume ID it will not be possible for that RAN node to resolve which RAN node in which PLMN the UE context is located.

A similar problem could occur when paging a UE. In case the UE has been assigned a Tracking Area list which spans both the shared part of the PLMN and non-shared part. In this case, if the network pages the UE with the Resume ID assigned in the non-shared part, it is possible that the wrong UE will respond to the message since the Resume IDs could be reused by the different operator.

Certain aspects of the present disclosure and their embodiments may provide solutions to these or other challenges.

Some solutions described herein are based on the following principles:

1. Introduction of a PLMN-specific RAN node identity in the RAN nodes participating in a RAN Sharing scenario. Each operator can configure the RAN identity, e.g. by means of operation and maintenance (O&M) without the need to coordinate it with other operators sharing the RAN.
2. RAN nodes exchanging their PLMN-specific RAN node identities when establishing their inter RAN node interfaces, i.e. Xn interfaces.
3. RAN node constructing a UE's Resume ID based on the RAN node identity that is specific to UE's registered PLMN.
4. At RRC_CONNECTED to RRC_INACTIVE transition ((see FIG. 10) the UE is provided by the RAN with a Resume ID that carries a PLMN-specific RAN node identity of the PLMN that the UE is registered with.
5. At RRC_CONNECTED to RRC_INACTIVE transition, the UE associates the Resume ID received from the RAN with its registered PLMN identity.
6. At RRC_INACTIVE to RRC_CONNECTED transition ((see FIG. 11) the UE sends to the RAN: (i) its registered PLMN; and (ii) the Resume ID received from the node the UE was last connected to. The coding of the registered PLMN information element could either be the full PLMN ID or it could be an index value indicating a specific PLMN on a PLMN list that the cell which the UE is connecting to has provided to the UE (E.g. via broadcast channel). Other coding are also possible.
7. The New RAN node locates the old RAN node based on the indication of the registered or selected PLMN and the PLMN specific RAN identity received from the UE's Resume ID. In some embodiments, location of the old_RAN node is based on the knowledge of the PLMN specific RAN node identity being associated with an inter RAN node interface, i.e. Xn interface. Or, in other embodiments, if the identity is not available on any Xn interface, the new_RAN will trigger a UE Context retrieval procedure as shown in FIG. 13 including selecting a CN node (AMF) that supports the UE's registered/selected PLMN.
8. Based on these, various embodiments are disclosed, including, but not limited to a UE (and corresponding method) resuming a connection in a target cell, providing the network with a resume identifier and indication of registered PLMN (or selected PLMN). Additional embodiments include a UE (and corresponding method) listening for paging in a suspended or idle state. The paging message consists of an indication of a PLMN and UE identifier (e.g. resume ID) associated with that PLMN. Additional embodiments include associated network nodes and corresponding methods.

There are, proposed herein, various embodiments which address one or more of the issues disclosed herein. Certain embodiments may provide one or more of the following technical advantage(s). For instance, certain embodiments enable a UE Context transfer from RAN nodes that share a common RAN node addressing space. The proposed solutions do not require on the identifiers coordination between RAN Sharing operators. Furthermore, the proposed solutions avoid ambiguities on the UE identifier (Resume ID) which could have a negative impact on the UE performance e.g. battery consumption, delays, due to unnecessary signalling. Certain embodiments may provide some, none, or all of these advantages. Other technical advantages may be readily apparent to one of skill in the art.

More particularly, the solutions disclosed in this document introduce the concept of the PLMN-specific RAN node identity that is associated with the UE's Resume ID (e.g. it could be included in the Resume ID or mapped to the Resume ID using a data base or lookup table). This has further consequences on the UE RAN paging procedure that includes the Resume ID as UE's identity in the paging message sent over the radio interface.

Given that the RAN node identity included in the Resume ID is using a common addressing space shared by the operators involved in the RAN Sharing scenario, it is ambiguous when presented in the paging message to UEs registered to the different PLMNs (operators), i.e. multiple UEs registered with different PLMNs (operators) would potentially reply to that paging message as they may have the same RAN node identity in their Resume IDs.

According to some embodiments, a solution to the problem is the inclusion of an index value (or other information) referring to the UE's registered PLMN. In case it is an index value the index may point at a PLMN on the PLMN list broadcasted in the system information in the cell where the UE is paged. In order for the paging node to know which PLMN to indicate it needs to receive this information from the node initiating the paging, which could be the RAN node storing the UE context. This information could be provided over X2 or Xn or S1 or NG-C signaling between RAN nodes, and between CN and RAN nodes. The information can be transferred as part of the paging message.

In scenarios where different cells paging the UE may broadcast the paged UE's registered PLMN identity at different positions, the RAN node initiating the paging process and compiling the Paging message that might be sent to other RAN nodes, either via the inter RAN node Xn interface or via the 5G CN via the N2/NG-C interface (see FIG. 14), shall include the paged UE's registered PLMN identity as part of the message that will be consumed by the RAN node that sends the paging over the radio interface.

The RAN node that sends the paging over the radio interface inserts the index referring to the UE's registered PLMN as it is broadcast in the system information (i.e. position among the PLMNs being broadcast).

In a specific embodiment of the present disclosure, and to combat challenges with coordination needs in, e.g., Multi-Operator Core Networks (MOON) a cell identity and a tracking area code may be introduced to be valid per PLMN. With this may also follow that a RAN Area is separate per PLMN, for example if a RAN Area is associated with a set of cell ID's (where the Cell ID's are PLMN)

For Shared RAN, e.g., like MOON, or other types of shared deployments, in particular Neutral Host operator deployments, another identifier to handle is the resume ID that is used both for RAN paging of the UE, RAN Area updates and when a UE trigger a transition from RRC_INACTIVE to RRC_CONNECTED, for purposes of transmitting UL data.

In E-UTRAN/LTE the resume ID is constructed including a combination of the eNB ID (20 bits) and a eNB specific UE identity (20 bits). It is currently not decided exactly how the Resume ID will be constructed in NR, but from a UE perspective though, the resume ID should only be a random number, irrespective of how it is constructed.

When the Resume ID is received, e.g., in RRCConnectionResumeRequest and if the context is not stored in the receiving gNB, the context needs to be fetched from another node. If the receiving gNB is a gNB serving multiple PLMN's, there is currently no obvious way of knowing what other gNB's that may hold the context of the UE and with many PLMN's, it could quickly become many other gNB's to inquire about context information from, in several PLMN's. Thus, receiving a resume ID in a gNB serving several PLMN's, if context is not stored in the same gNB, it may be necessary to attempt to fetch the context from one of many different gNB's, belonging to different PLMN's. One way of addressing this is to somehow divide or coordinate the usage of the resume ID's, such that a gNB receiving a resume ID will immediately be able to connect it to a specific PLMN and then implicitly be able to limit the amount of other nodes to inquire about context ID. It would be attractive if this coordination could be avoided as it will affect the amount of resume ID's in all PLMN's that share a RAN node. To address the minimization of coordination between different PLMN's, according to a specific embodiment of the present invention, the Resume ID is made valid only per Registered PLMN and this Registered PLMN would then need to be included in UE-initiated signaling, e.g., RRCConnectionResumeRequest/msg3 and stored with/in the UE context.

Including the PLMN identity would remove any need for coordination over PLMN borders, it would be more feasible to handle resume requests in gNB's serving several PLMN's and each PLMN would have the complete set of Resume ID's available to use. Thus, the registered PLMN should be included in initial signaling together with a Resume ID, or other indication that points to a UE Context in the RAN. Similarly, the Registered PLMN may also be stored in the UE Context in the network (e.g., RAN) in connection to initial creation of the context.

According to other aspects of the present disclosure, a PLMN indication is also included in RAN Area Paging.

There are different ways to include a PLMN ID. Including the complete PLMN ID will be bit costly and even though it is possible, it may be preferable to indicate the PLMN with an index, for example given from system information where an index for each supported PLMN may be set.

In some embodiments of the present disclosure, the Resume ID may be associated with a specific PLMN ID which may be indicated to the UE with dedicated signaling when the network provides the UE with the Resume ID or with common signaling, e.g., in system information. The specific PLMN ID may be indicated explicitly or as an index which may point at a PLMN on the PLMN list broadcasted in the system information. The specific PLMN ID may be the registered PLMN of the UE. That the PLMN ID associated with the Resume ID is the registered PLMN of the UE may be indicated explicitly (e.g., with a special indicator) or with a special/predefined index code point. The specific PLMN ID may be the primary PLMN pertaining to a cell or PSS/SSS. That the PLMN ID associated with the Resume ID is the primary PLMN of a cell or PSS/SSS may be indicated explicitly or with a special index code point.

As described above, when the UE requests a transition from RRC_INACTIVE state to RRC_CONNECTED state, the UE indicates to the network the specific PLMN ID which the Resume ID is associated with and the Resume ID. The indication of the specific PLMN ID may be the explicit/full PLMN ID, or an index value indicating a specific PLMN on a PLMN list that the cell which the UE is connecting to has provided to the UE (E.g. via broadcast channel). Other codings are also possible. When the Resume ID is associated with the primary PLMN of the cell or PSS/SSS where it was assigned and the primary PLMN of the cell or PSS/SSS where the transition from RRC_INACTIVE to RRC_CONNECTED is requested, the indication may be a special/predefined index code point, a special indicator or absence of indication of associated PLMN ID.

In some embodiments of the present disclosure, the UE attempts/requests transition from RRC_INACTIVE state to RRC_CONNECTED state only when the PLMN with which the Resume ID is associated is available.

In some embodiments of the present disclosure, the UE attempts/requests transition from RRC_INACTIVE state to RRC_CONNECTED state only when the UE's registered PLMN is available.

In some embodiments of the present disclosure, when the PLMN with which the Resume ID is associated is not available, the UE does not attempt/request transition from RRC_INACTIVE state to RRC_CONNECTED state, but leaves RRC_INACTIVE state (or goes to RRC_IDLE state), and attempts/requests establishment of a new connection.

In some embodiments of the present disclosure, when the UE's registered PLMN is not available, the UE does not attempt/request transition from RRC_INACTIVE state to RRC_CONNECTED state, but leaves RRC_INACTIVE state (or goes to RRC_IDLE state), and attempts/requests establishment of a new connection.

Figure 15:
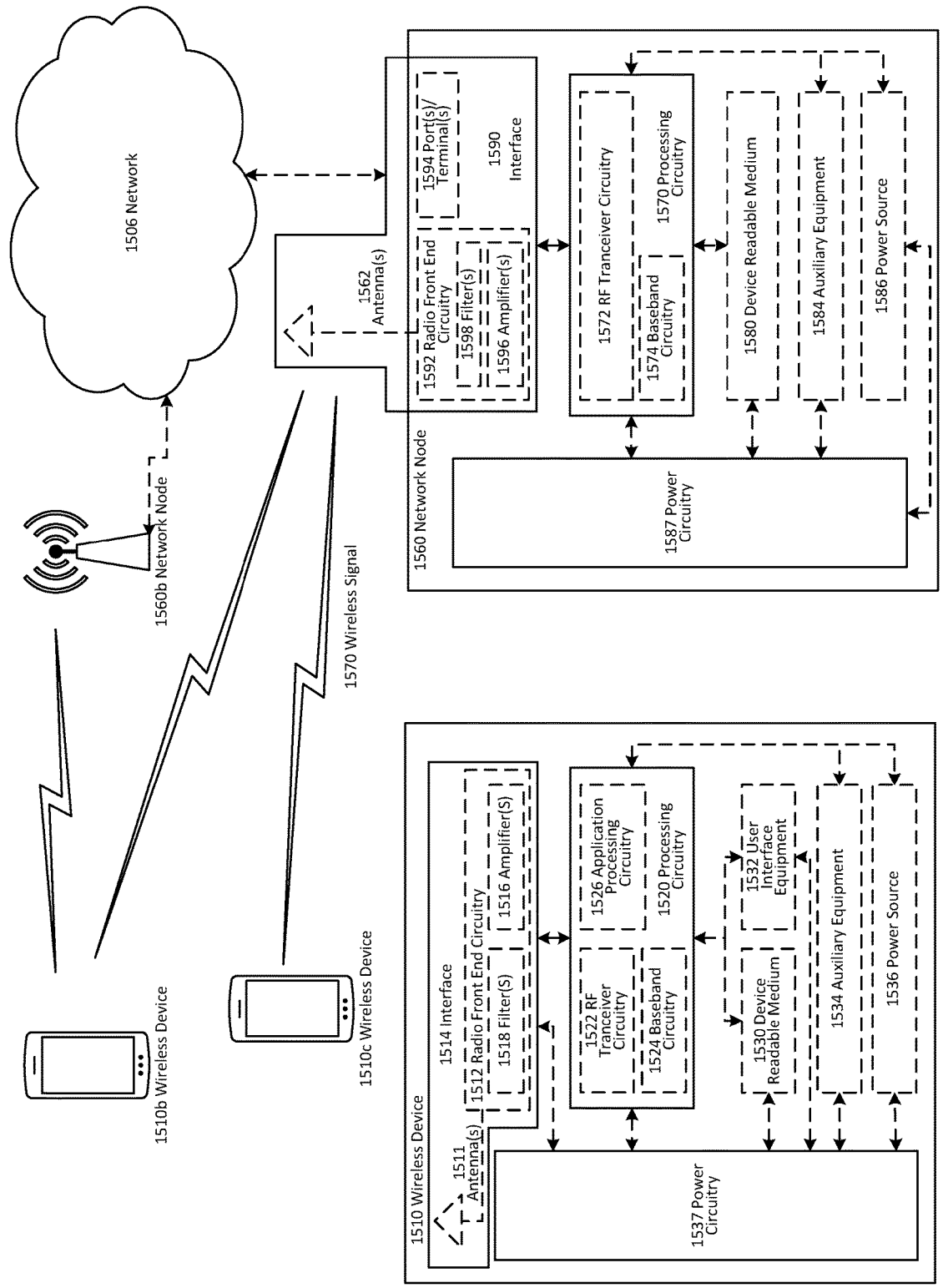
FIG. 15 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units.

In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
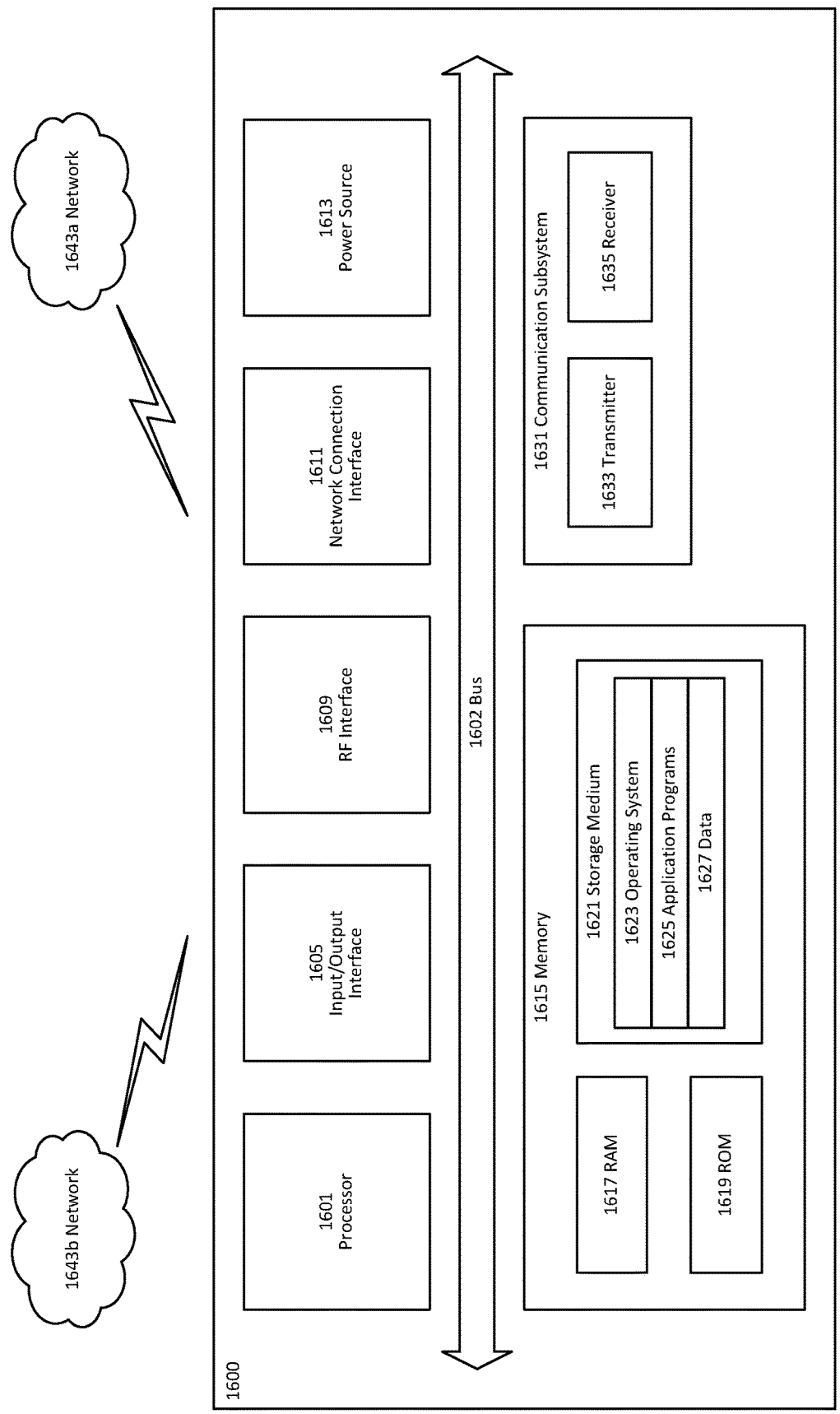
FIG. 16 is a block diagram of a user equipment according to some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 1600, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643*b* using communication subsystem 1631. Network 1643*a* and network 1643*b* may be the same network or networks or different network or networks. Communication subsystem 1631 may be configured to include one or more transceivers used to communicate with network 1643*b*. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
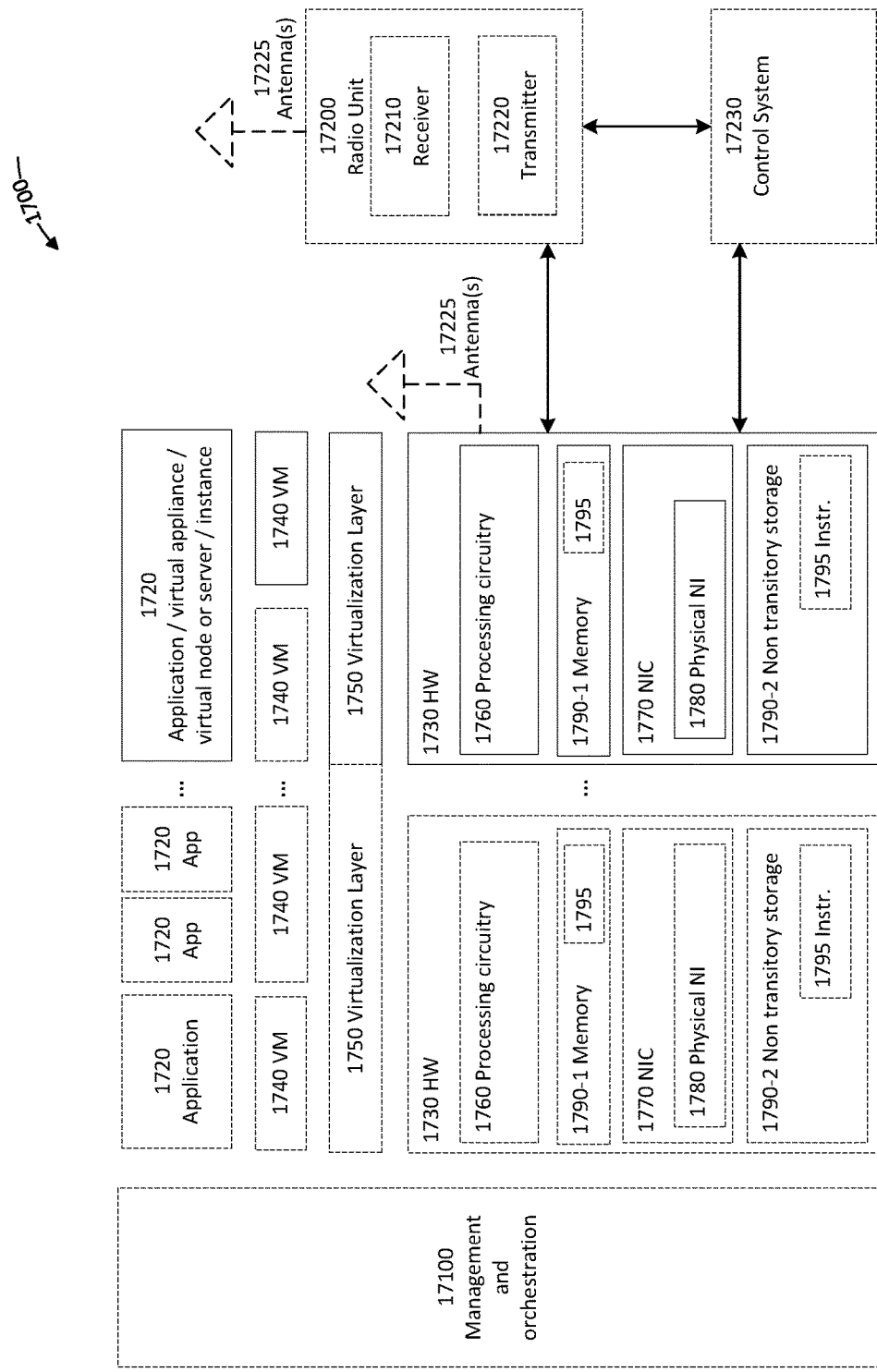
FIG. 17 is a block diagram of a virtualization environment according to some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure 18:
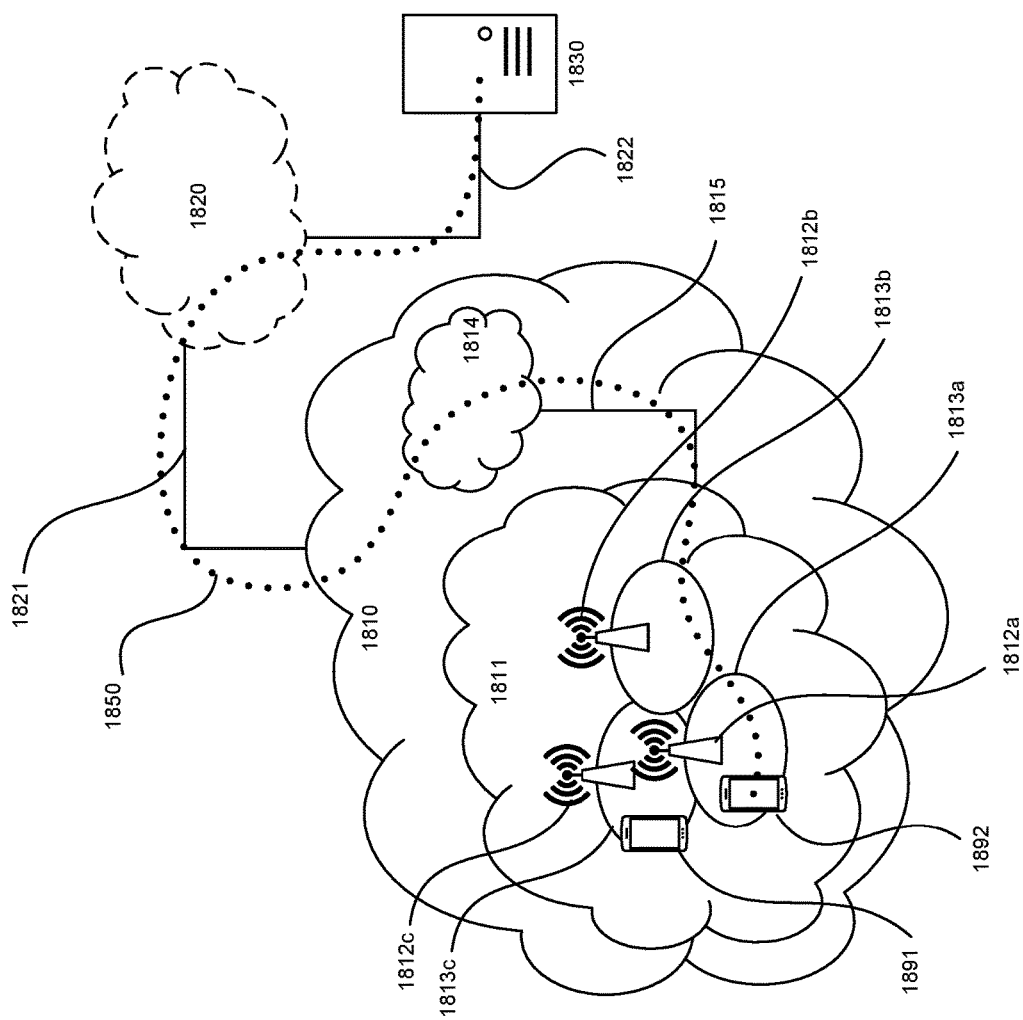
FIG. 18 is a block diagram of a communication network with a host computer according to some embodiments.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardy may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 5) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

Figure 19:
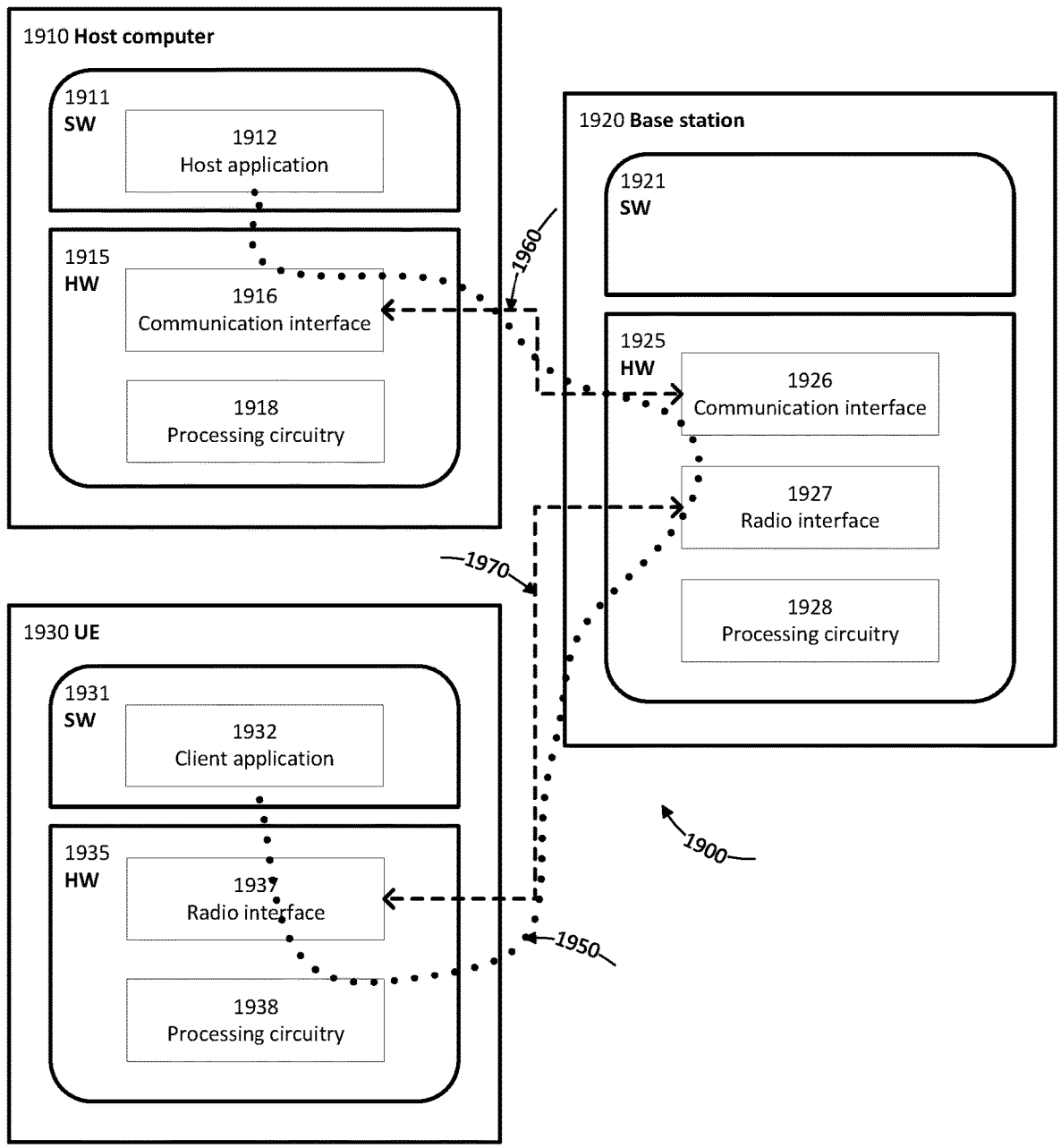
FIG. 19 is a block diagram of a host computer according to some embodiments.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the latency and power consumption and thereby provide benefits such as reduced delays, better responsiveness, and extended battery lifetime.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
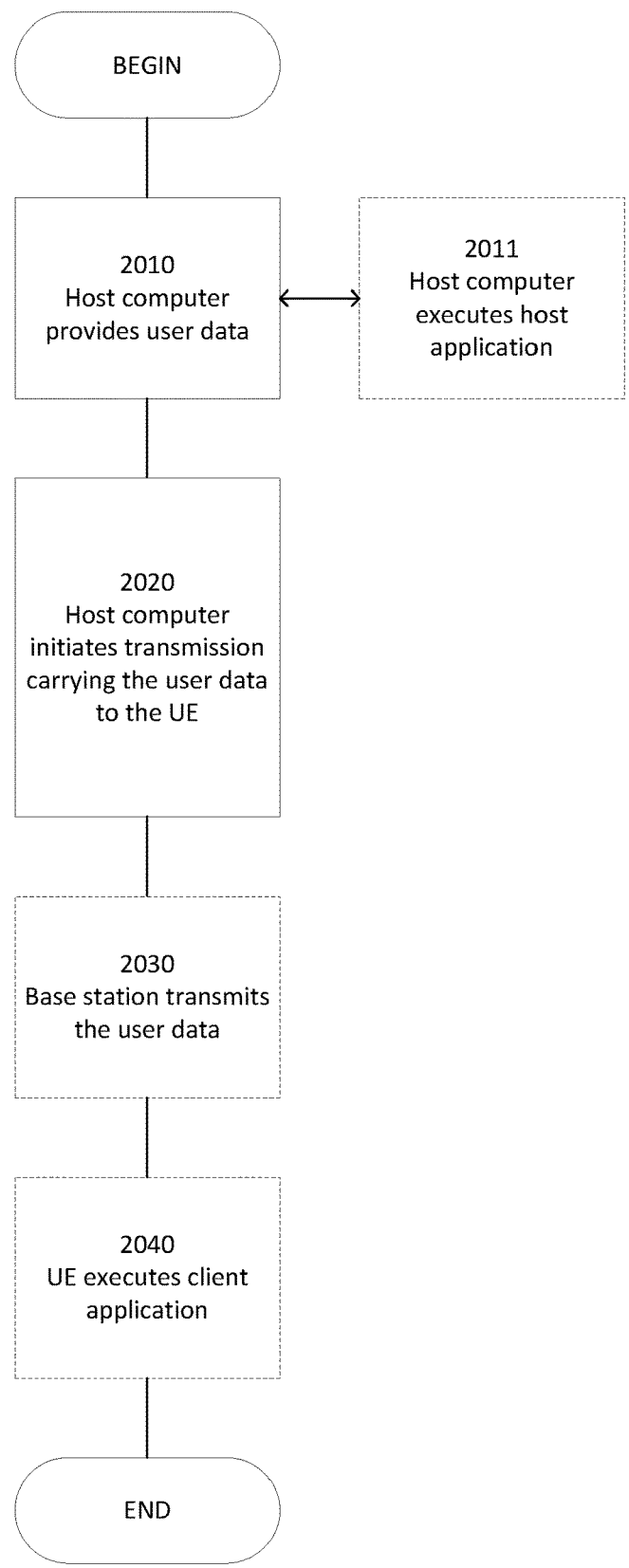
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
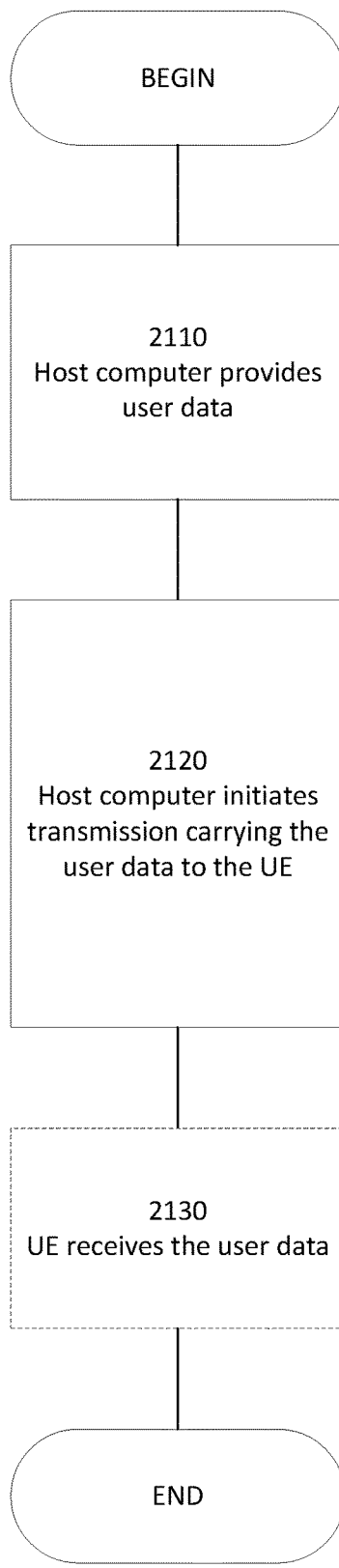
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
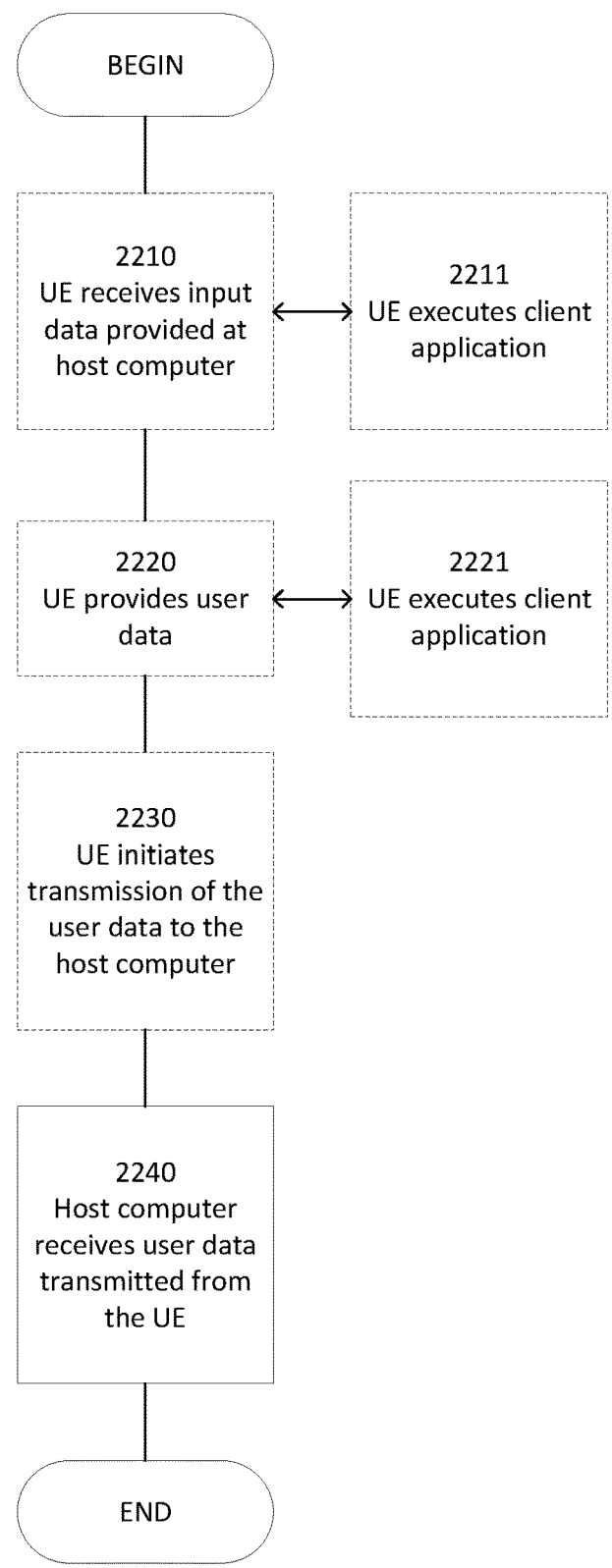
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
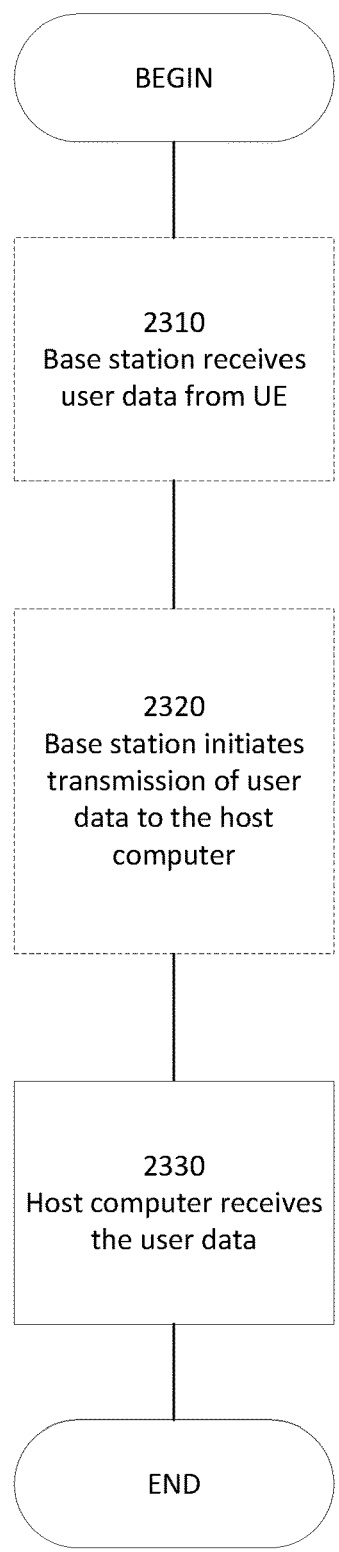
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

Some of the embodiments contemplated herein are described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art.

The invention claimed is:

1. A method performed by a user equipment, the method comprising:
  receiving, via a radio access network (RAN), a radio resource control (RRC) message indicating to transition from RRC_CONNECTED to RRC_INACTIVE, wherein the RRC message includes a resume identifier; and performing a connection resume procedure, including:
   transmitting, to the RAN, an RRC connection resume request that includes the resume identifier; and
   transmitting, to the RAN, an RRC resume complete message that includes an index of a selected public land mobile network (PLMN) identity.

2. The method of claim 1, wherein the index of the selected PLMN identity is selected from a list of PLMN identities.

3. The method of claim 2, wherein each PLMN identity in the list of PLMN identities has an associated index.

4. The method of claim 2, further comprising:
   receiving, via the RAN, system information that includes the list of PLMN identities.

5. The method of claim 4, wherein the system information is transmitted as part of a paging message.

6. The method of claim 1, wherein the connection resume procedure transitions the user equipment from RRC_INACTIVE to RRC_CONNECTED.

7. The method of claim 1, wherein the selected PLMN identity is supported by a particular core network node.

8. The method of claim 1, wherein the resume identifier includes a combination of a user equipment identifier and a base station identifier.

9. A user equipment comprising:
   a non-transitory memory; and
   processing circuitry coupled to the non-transitory memory and configured to read instructions from the non-transitory memory to cause the user equipment to perform operations comprising:
      receiving, via a radio access network (RAN), a radio resource control (RRC) message indicating to transition from RRC_CONNECTED to RRC_INACTIVE, wherein the RRC message includes a resume identifier; and
      performing a connection resume procedure, including:
         transmitting, to the RAN, an RRC connection resume request that includes the resume identifier; and
         transmitting, to the RAN, an RRC resume complete message that includes an index of a selected public land mobile network (PLMN) identity.

10. The user equipment of claim 9, wherein the index of the selected PLMN identity is selected from a list of PLMN identities.

11. The user equipment of claim 10, wherein each PLMN identity in the list of PLMN identities has an associated index.

12. The user equipment of claim 10, further comprising:
   receiving, via the RAN, system information that includes the list of PLMN identities.

13. The user equipment of claim 12, wherein the system information is transmitted as part of a paging message.

14. The user equipment of claim 9, wherein the connection resume procedure transitions the user equipment from RRC_INACTIVE to RRC_CONNECTED.

15. The user equipment of claim 9, wherein the selected PLMN identity is supported by a particular core network node.

16. A non-transitory device-readable medium having stored thereon instructions that, when executed by processing circuitry of a user equipment, cause the user equipment to perform operations comprising:
   receiving, via a radio access network (RAN), a radio resource control (RRC) message indicating to transition from RRC_CONNECTED to RRC_INACTIVE, wherein the RRC message includes a resume identifier; and
   performing a connection resume procedure, including:
      transmitting, to the RAN, an RRC connection resume request that includes the resume identifier; and
      transmitting, to the RAN, an RRC resume complete message that includes an index of a selected public land mobile network (PLMN) identity.

17. The non-transitory device-readable medium of claim 16, wherein the index of the selected PLMN identity is selected from a list of PLMN identities.

18. The non-transitory device-readable medium of claim 17, wherein each PLMN identity in the list of PLMN identities has an associated index.

19. The non-transitory device-readable medium of claim 17, further comprising:
   receiving, via the RAN, system information that includes the list of PLMN identities.

20. The non-transitory device-readable medium of claim 16, wherein the connection resume procedure transitions the user equipment from RRC_INACTIVE to RRC_CONNECTED.

* * * * *